(12) United States Patent
Shinohara et al.

(10) Patent No.: US 12,181,161 B2
(45) Date of Patent: Dec. 31, 2024

(54) COOKING APPARATUS AND CONTROL METHOD THEREOF

(71) Applicant: SAMSUNG ELECTRONICS CO., LTD., Suwon-si (KR)

(72) Inventors: Nobuhiko Shinohara, Yokohama (JP); Katsunori Araki, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 545 days.

(21) Appl. No.: 17/531,362

(22) Filed: Nov. 19, 2021

(65) Prior Publication Data

US 2022/0163214 A1 May 26, 2022

Related U.S. Application Data

(63) Continuation of application No. PCT/KR2021/016816, filed on Nov. 16, 2021.

(30) Foreign Application Priority Data

Nov. 26, 2020 (JP) .................................. 2020-196030
Sep. 7, 2021 (KR) ......................... 10-2021-0119352

(51) Int. Cl.
*F24C 7/08* (2006.01)
*G01K 1/024* (2021.01)
(Continued)

(52) U.S. Cl.
CPC .............. *F24C 7/087* (2013.01); *F24C 7/085* (2013.01); *G01K 1/024* (2013.01); *G06V 20/64* (2022.01);
(Continued)

(58) Field of Classification Search
CPC ......... F24C 7/087; F24C 7/085; G01K 1/024; G01K 2207/06
See application file for complete search history.

(56) References Cited

U.S. PATENT DOCUMENTS

2016/0316525 A1  10/2016 Vainionpa
2019/0128531 A1*  5/2019 Abdoo .................... F24C 7/086

FOREIGN PATENT DOCUMENTS

EP   1 148 763 A2   10/2001
JP      5-52339      3/1993
(Continued)

OTHER PUBLICATIONS

PCT/ISA/210 dated Mar. 15, 2022 in International Patent Application No. PCT/KR2021/016816 (3 pages).

*Primary Examiner* — Thien S Tran
(74) *Attorney, Agent, or Firm* — STAAS & HALSEY LLP

(57) ABSTRACT

A cooking apparatus includes a cooking chamber in which a food material is to be placed, a heating portion configured to heat an inside of the cooking chamber, a temperature sensor disposed inside the cooking chamber to detect a temperature of the food material, and a processor. The processor is configured to determine conditions including a target rate of an internal temperature rise of the food material and a target reach internal temperature of the food material, based on a type and a size of the food material, and to adjust an output of the heating portion based on the conditions and an internal temperature of the food material determined based on the temperature of the food material detected by the temperature sensor.

14 Claims, 23 Drawing Sheets

(51) Int. Cl.
*G06F 18/22* (2023.01)
*G06V 20/64* (2022.01)
*G06V 20/68* (2022.01)

(52) U.S. Cl.
CPC .......... *G01K 2207/06* (2013.01); *G06F 18/22* (2023.01); *G06V 20/68* (2022.01)

(56) References Cited

FOREIGN PATENT DOCUMENTS

| | | | | |
|---|---|---|---|---|
| JP | 5-79642 A | 3/1993 | | |
| JP | 6-40708 | 5/1994 | | |
| JP | 8-215062 A | 8/1996 | | |
| JP | 2000-62104 A | 2/2000 | | |
| JP | 2007-218545 A | 8/2007 | | |
| JP | 5063458 B2 | 8/2012 | | |
| JP | 2020139709 A | * | 9/2020 | ............... A23L 5/10 |
| KR | 10-2009-0044749 | 5/2009 | | |
| KR | 10-2018-0083167 | 7/2018 | | |
| KR | 10-2020-0070083 | 6/2020 | | |
| KR | 10-2020-0105621 | 9/2020 | | |

\* cited by examiner

F : Fa, Fb

COOKING APPARATUS AND CONTROL METHOD THEREOF

CROSS REFERENCE TO RELATED APPLICATIONS

This application is a continuation application under 35 U.S.C. § 111 (a) of International Application No. PCT/KR2021/016816, filed on Nov. 16, 2021, which claims priority to Japanese Patent Application No. 2020-196030 filed on Nov. 26, 2020, and Korean Patent Application No. 10-2021-0119352 filed on Sep. 7, 2021. The disclosures of International Application No. PCT/KR2021/016816, Japanese Patent Application No. 2020-196030, and Korean Patent Application No. 10-2021-0119352 are incorporated by reference herein in their entirety.

BACKGROUND

1. Field

The disclosure relates to a cooking apparatus.

2. Description of the Related Art

A cooking apparatus is a home appliance that heats and cooks a food material, and recently, the cooking apparatus has controlled heating of food according to a change in a temperature or a state of the food material.

For example, a known cooking apparatus includes a temperature sensor configured to detect a surface temperature of food material, and estimates an internal temperature of the food material from the surface temperature of the food material sensed by the temperature sensor, thereby performing heating-cooking to effectively increase a taste component of the food material based on the internal temperature of the food material.

However, in the known cooking apparatus, a user has to adjust a degree of heating of the food material in order to cook the food material with a preferred texture and taste, and further a user has to manually set a position or a cooking condition of each food material for simultaneously cooking two or more types of food material, which causes a complicated and difficult operation for the user.

SUMMARY

Additional aspects of the disclosure will be set forth in part in the description which follows and, in part, will be apparent from the description, or may be learned by practice of the example embodiments disclosed herein.

In accordance with one or more aspects of the disclosure, a cooking apparatus includes a cooking chamber, a heating portion configured to heat an inside of the cooking chamber, a temperature sensor disposed inside the cooking chamber and configured to detect a temperature of the food material, when the food material is placed in the cooking chamber, and a processor. The processor may be configured to determine conditions including a target rate of an internal temperature rise of the food material and a target reach internal temperature of the food material, based on a type and a size of the food material, and adjust an output of the heating portion based on the conditions and an internal temperature of the food material determined based on the temperature of the food material detected by the temperature sensor.

The cooking apparatus may further include a three-dimensional (3D) sensor configured to detect a 3D shape of the food material, and an imager configured to obtain an image of the food material by imaging the inside of the cooking chamber. The processor may be configured to determine the type and the size of the food material based on the 3D shape of the food material detected by the 3D sensor and the image of the food material obtained by the imager.

The processor may be configured to control the heating portion to perform a first temperature range heating operation until the internal temperature of the food material reaches a first set temperature, and control the heating portion to perform a second temperature range heating operation in which a rate of the internal temperature rise of the food material follows the target rate of the internal temperature rise of the food material in a range in which the internal temperature of the food material is greater than or equal to the first set temperature and less than or equal to a second set temperature.

The processor may be configured to, in response to the internal temperature of the food material reaching the second set temperature, control the heating portion to perform a third temperature range heating operation until the internal temperature of the food material reaches the target reach internal temperature of the food material.

The cooking apparatus may further include a control panel, and the processor may be configured to control the heating portion to terminate a heating operation in response to the internal temperature of the food material reaching the second set temperature, and control the control panel to output a cooking completion notification in response to the internal temperature of the food material reaching the target reach internal temperature of the food material.

The processor may be configured to determine a surface state of the food material based on the image of the food material, and control the heating portion to terminate a heating operation based on the surface state of the food material.

The cooking apparatus may further include a control panel configured to receive an input by a user, and the processor may be configured to determine the conditions based on setting information input by the user through the control panel.

The processor may be configured to determine a surface temperature of the food material based on an output of the temperature sensor, and determine the internal temperature of the food material based on the surface temperature of the food material.

The heating portion may include a plurality of heaters, and a plurality of motors configured to transmit a rotational force corresponding to each heater among the plurality of heaters. The processor may be configured to, when a plurality of food materials are placed in the cooking chamber, determine one or more areas, in which each food material among the plurality of food materials is placed, based on the 3D shape of each food material detected by the 3D sensor and an image of each food material among the plurality of food materials obtained by the imager, and the processor is configured to control the plurality of motors to rotate the plurality of heaters to allow the one or more areas, in which each food material among the plurality of food materials is placed, to be included in a heating area heated by one or more of the plurality of heaters.

The plurality of food materials may include a first food material and a second food material. The processor may be configured to adjust a heating time in a state, in which an internal temperature of the first food material is greater than a second set temperature or less than a first set temperature, to correspond to a heating time of the second food material so as to simultaneously complete cooking of the first food material and the second food material.

In accordance with one or more aspects of the disclosure, a control method of a cooking apparatus including a cooking chamber in which a food material is to be placed, a heating portion configured to heat an inside of the cooking chamber, and a temperature sensor disposed inside the cooking chamber, includes determining conditions including a target rate of an internal temperature rise of the food material and a target reach internal temperature of the food material, based on a type and a size of the food material, and adjusting an output of the heating portion based on the conditions and an internal temperature of the food material determined based on a temperature of the food material detected by the temperature sensor.

The cooking apparatus may further include a three-dimensional (3D) sensor configured to detect a 3D shape of the food material, and an imager configured to obtain an image of the food material by imaging the inside of the cooking chamber. The control method may further include determining the type and the size of the food material based on a 3D shape of the food material detected by a 3D sensor of the cooking apparatus and based on an image of the food material obtained by an imager of the cooking apparatus when the food material is placed inside the cooking chamber.

The adjusting the output of the heating portion may include controlling the heating portion to perform a first temperature range heating operation until the internal temperature of the food material reaches a first set temperature, and controlling the heating portion to perform a second temperature range heating operation in which a rate of the internal temperature rise of the food material follows the target rate of the internal temperature rise of the food material in a range in which the internal temperature of the food material is greater than or equal to the first set temperature and less than or equal to a second set temperature.

The adjusting the output of the heating portion may include, in response to the internal temperature of the food material reaching the second set temperature, controlling the heating portion to perform a third temperature range heating operation until the internal temperature of the food material reaches the target reach internal temperature of the food material.

The cooking apparatus may further include a control panel. The adjusting the output of the heating portion may include controlling the heating portion to terminate a heating operation in response to the internal temperature of the food material reaching the second set temperature, and controlling a control panel of the cooking apparatus to output a cooking completion notification in response to the internal temperature of the food material reaching the target reach internal temperature of the food material.

The adjusting the output of the heating portion may include determining a surface state of the food material based on the image of the food material, and controlling the heating portion to terminate a heating operation based on the surface state of the food material.

The cooking apparatus may further include a control panel configured to receive an input by a user. The control method may further include determining the conditions based on setting information input by a user through a control panel of the cooking apparatus.

The control method may further include determining a surface temperature of the food material based on an output of the temperature sensor, and determining the internal temperature of the food material based on the surface temperature of the food material.

The heating portion may include a plurality of heaters, and a plurality of motors configured to transmit a rotational force corresponding to each heater among the plurality of heaters. The control method may further include, when a plurality of food materials are placed in the cooking chamber, determining one or more areas, in which each food material among the plurality of food materials is placed, based on a three-dimensional (3D) shape of each food material detected by a 3D sensor of the cooking apparatus and an image of each food material among the plurality of food materials obtained by an imager of the cooking apparatus, and controlling a plurality of motors of the cooking apparatus to rotate a plurality of heaters to allow the one or more areas, in which each food material among the plurality of food materials is placed, to be included in a heating area heated by one or more of the plurality of heaters.

The plurality of food materials may include a first food material and a second food material. The control method may further include adjusting a heating time in a state, in which an internal temperature of the first food material is greater than a second set temperature or less than a first set temperature, to correspond to a heating time of the second food material, so as to simultaneously complete cooking of the first food material and the second food material.

BRIEF DESCRIPTION OF THE DRAWINGS

These and/or other aspects, features, and advantages of the example embodiments of the disclosure will become apparent and more readily appreciated from the following description of embodiments, taken in conjunction with the accompanying drawings of which.

DETAILED DESCRIPTION

Figure 1:
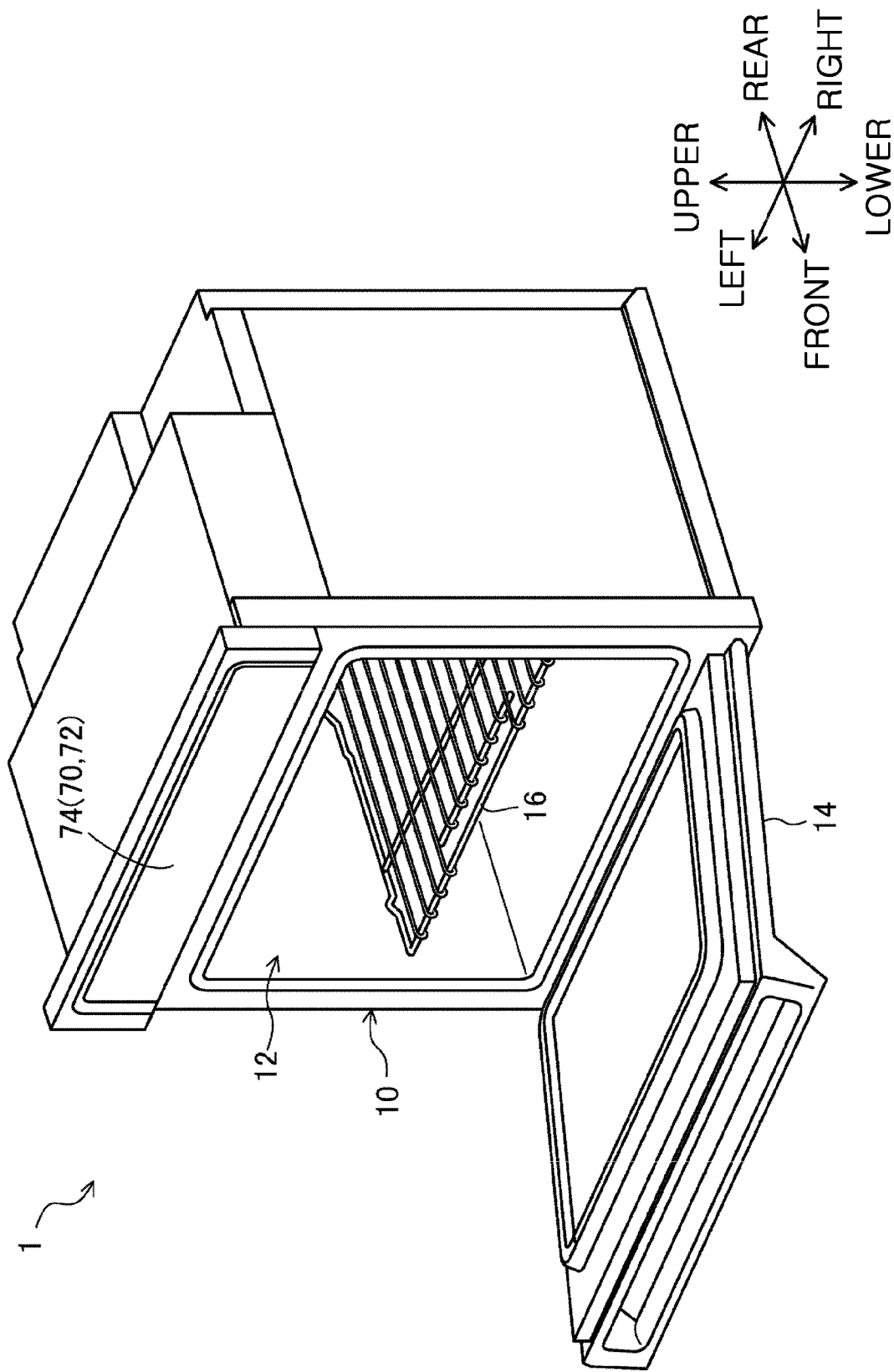
FIG. 1 is a perspective view of a cooking apparatus according to an embodiment of the disclosure.

Embodiments described in the disclosure and configurations shown in the drawings are merely examples of the embodiments of the disclosure, and may be modified in various different ways to replace the embodiments and drawings of the disclosure It will be understood that when an element is referred to as being "connected" to another element, the expression encompasses an example of a direct connection or direct coupling, as well as a connection or coupling with another element interposed therebetween. For example, in the context of communicating information an indirect connection may include a "connection via a wireless communication network".

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. These terms are only used to distinguish one element from another element. For example, without departing from the scope of the disclosure, a first element may be termed as a second element, and a second element may be termed as a first element.

In the following description, terms such as "unit", "part", "block", "member", and "module" indicate a unit for processing at least one function or operation. For example, those terms may refer to at least one process processed by at least one hardware such as Field Programmable Gate Array (FPGA), Application Specific Integrated Circuit (ASIC), at least one software stored in a memory or a processor.

An identification code is used for the convenience of the description but is not intended to illustrate the order of each operation. Each operation may be implemented in an order different from the illustrated order unless the context clearly indicates otherwise.

The scope of the expression or phrase of "and/or" includes a plurality of combinations of relevant items or any one item among a plurality of relevant items. For example, the scope of the expression or phrase "A and/or B" includes the item "A", the item "B", and the combination of items "A and B".

In addition, the scope of the expression or phrase "at least one of A and B" is intended to include all of the following: (1) at least one of A, (2) at least one of B, and (3) at least one A and at least one of B. Likewise, the scope of the expression or phrase "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

The disclosure will be described more fully hereinafter with reference to the accompanying drawings.

In the following description, with respect to a cooking apparatus, an upper side in a vertical direction is referred to as "upper", a lower side is referred to as "lower", a side of an opening and closing door is referred to as "front", an opposite side of the opening and closing door is referred to as "rear", and when viewed from the front side, on which the opening and closing door is arranged, to the rear, a left side is referred to as "left" and a right side is referred to as "right".

One or more aspects of the disclosure relate to a cooking apparatus capable of automatically cooking a food material with a preferred texture and taste without requiring a complicated operation from a user, and a control method thereof.

In an example embodiment, a cooking apparatus configured to automatically perform heating-cooking on a single food material will be described.

Figure 2:
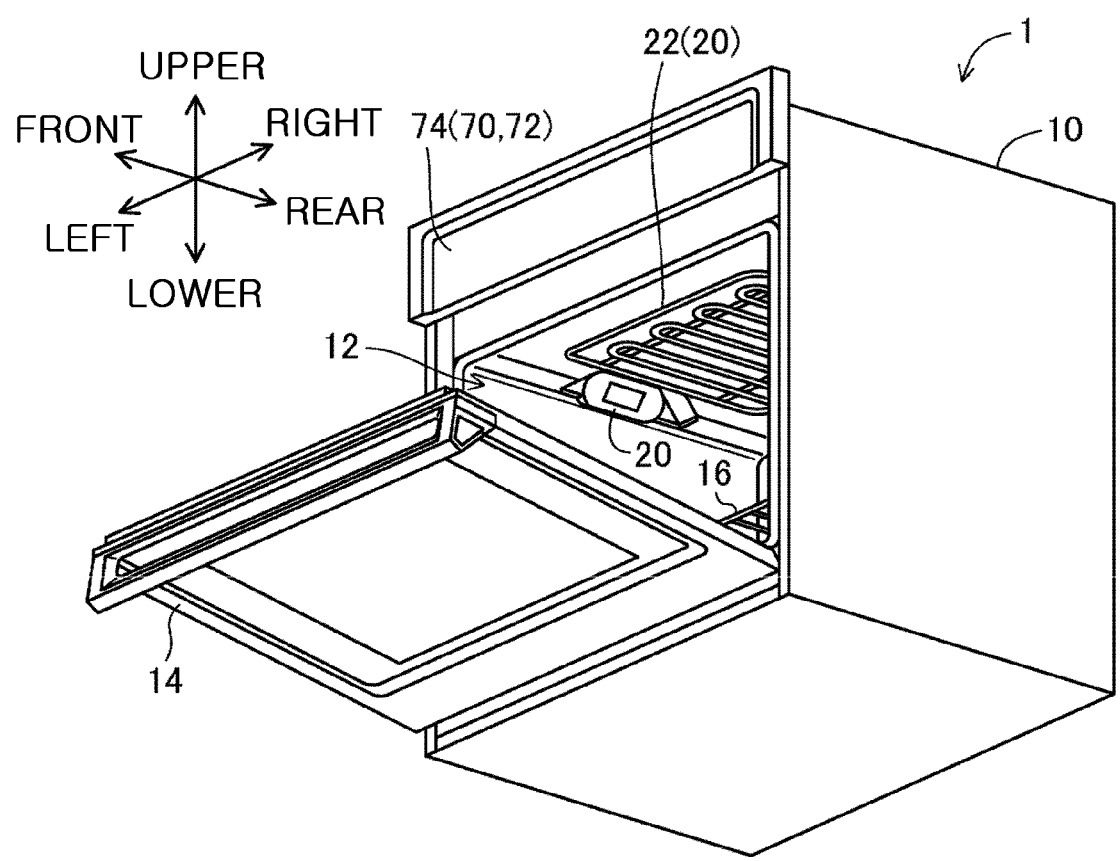
FIG. 2 is a perspective view of the cooking apparatus according to an embodiment of the disclosure.
Figure 3:
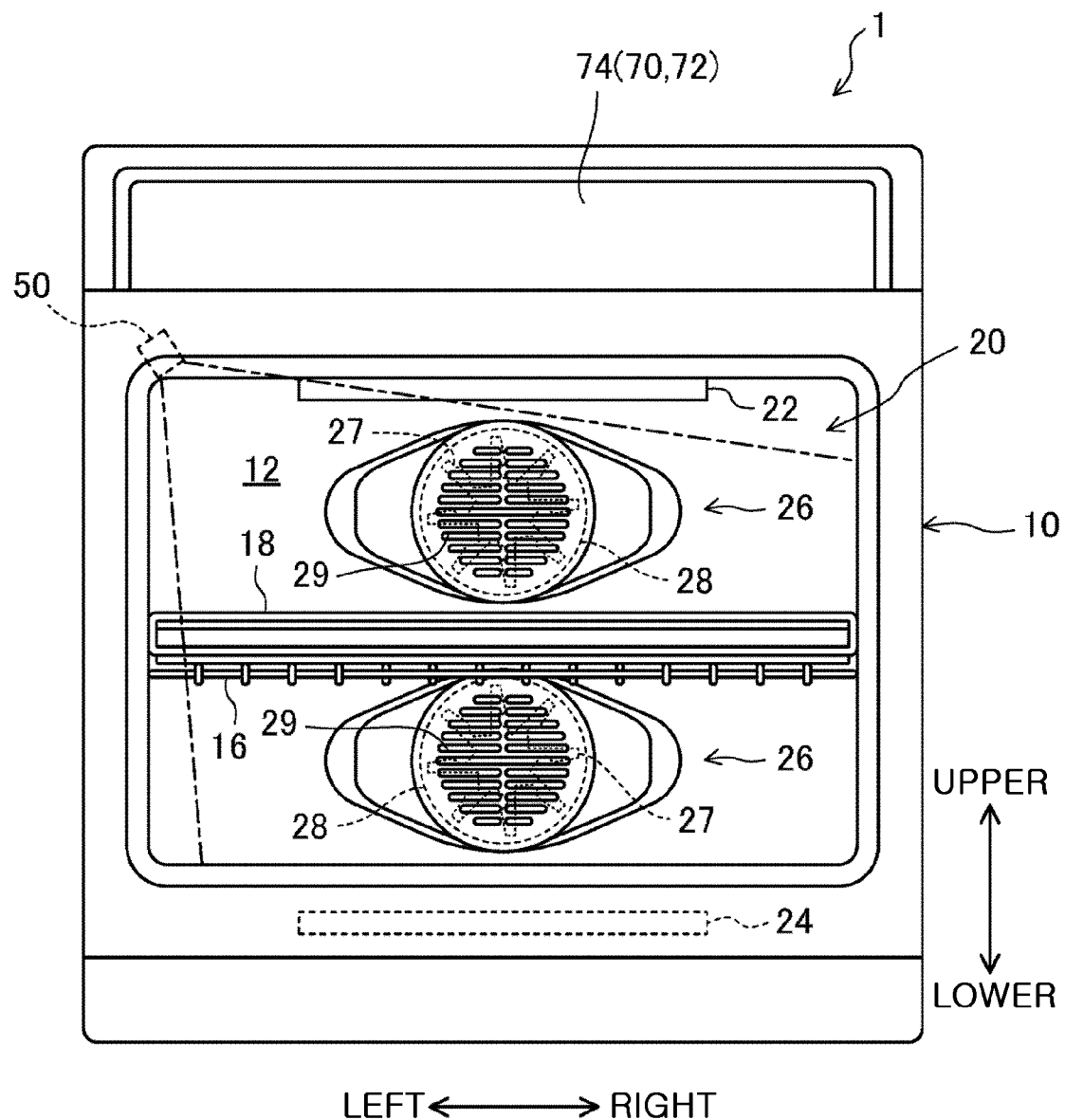
FIG. 3 is a front view of an inside of a cooking chamber of the cooking apparatus according to an embodiment of the disclosure.
Figure 4:
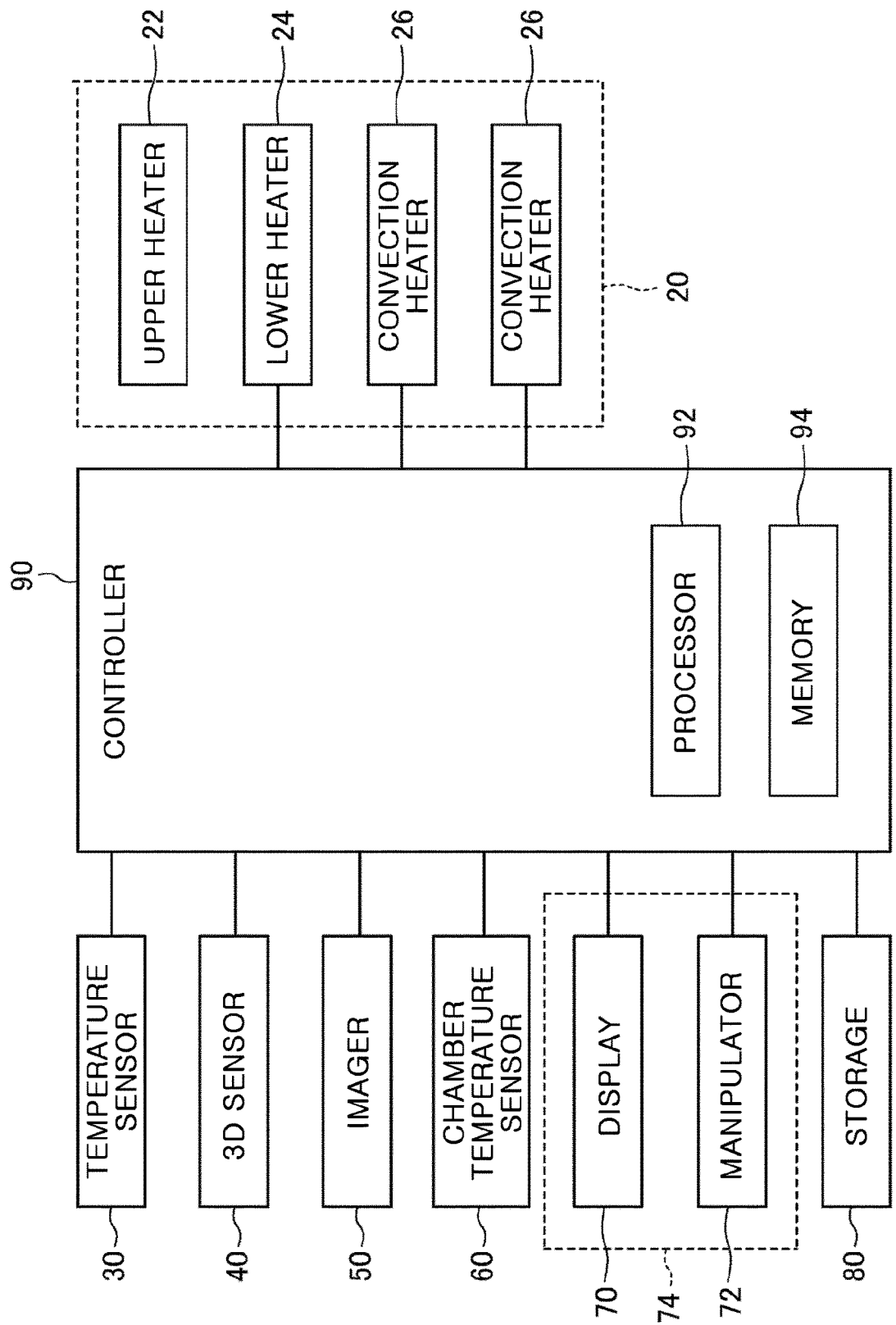
FIG. 4 is a control block diagram of the cooking apparatus according to an embodiment of the disclosure.

FIGS. 1 and 2 are perspective views of a cooking apparatus 1 according to an embodiment of the disclosure, FIG. 3 is a front view of an inside of a cooking chamber 12 of the cooking apparatus 1 according to an embodiment of the disclosure, and FIG. 4 is a control block diagram of the cooking apparatus 1 according to an embodiment of the disclosure.

Referring to FIGS. 1 to 4, the cooking apparatus 1 according to an embodiment may be a convection oven.

The cooking apparatus 1 includes a housing 10, a heating portion 20, a temperature sensor 30, a three-dimensional (3D) sensor 40, an imager 50, a chamber temperature sensor 60, a display 70, a manipulator 72, a storage 80 and a controller 90.

<Housing>

As illustrated in housing 10 is in the form of a rectangular parallelepiped box including an opening provided on the front side. However, the housing 10 may have a different shape. An inner space of the housing 10 forms the cooking chamber 12 in which a food material is placed. The food material is placed in the cooking chamber 12. The food material may be meat, fish, vegetables, or other kinds of food which may need to be cooked or heated. An opening and closing door 14 configured to open and close the cooking chamber 12 is provided on the front surface (opening surface) of the housing 10. The cooking chamber 12 is provided with a loading shelf 16.

The loading shelf 16 is formed by integrally combining a rectangular frame member formed of a wire with a plurality of rod members extending in a front and rear direction and aligned in a left and right direction inside the frame member. Opposite ends of the loading shelf 16 in the left and right directions are supported on a side wall of the housing 10, that is, a side portion that partitions the cooking chamber 12.

A tray 18 (see FIG. 9) may be mounted on the loading shelf 16. The tray 18 is a plate-shaped member which may be formed of a metal material (e.g., iron). A food material is loaded on the tray 18.

<Heating Portion>

The heating portion 20 heats the inside of the cooking chamber 12. The heating portion 20 may include a plurality of heaters. In this example, the plurality of heaters may include an upper heater 22, a lower heater 24, and a convection heater 26. The upper heater 22, the lower heater 24, and the convection heater 26 are configured to control an output individually and independently of each other.

The upper heater 22 is provided on an upper wall of the housing 10, that is, on an upper surface that defines the cooking chamber 12. The lower heater 24 is provided on a bottom wall of the housing 10, that is, on a lower surface that defines the cooking chamber 12. For example, the upper heater 22 and the lower heater 24 are each formed by heating wires that generate heat by energization. The upper heater 22 and the lower heater 24 may each be composed of an infrared heater emitting infrared rays, or may be composed of a combination of a heating wire and an infrared heater. Two convection heaters 26 may be provided on a rear wall of the housing 10, that is, a rear surface that defines the cooking chamber 12, in such a way that the two convention heaters are arranged to be spaced from each other in a vertical direction at a center portion, which is with respect to the left and right direction. Hereinafter the case in which the two convection heaters 26 are provided will be described as an example, but the number of convection heaters 26 is not limited thereto.

The convection heater 26 is a convection-type heater. The convection heater 26 includes a centrifugal fan 27 and a heat generator 28. The centrifugal fan 27 is arranged behind an air outlet 29 formed on the rear surface of the cooking chamber 12. The centrifugal fan 27 transfers air heated by the heat generator 28 into the cooking chamber 12. The heat generator 28 is formed of a heating wire which generates heat by energization. The heat generator 28 is provided to surround a periphery of the centrifugal fan 27. The convection heater 26 circulates air in the cooking chamber 12 by rotating the centrifugal fan 27.

The output of the heating portion 20 is adjustable. The output of the heating portion 20 depends on the number of heaters in an operation state and an output of the heater in the operation state among the plurality of heaters, such as the upper heater 22, the lower heater 24 and the convection heater 26. Under a condition in which the output of the plurality of heaters are the same, the output of the heating portion 20 may be increased as the number of heaters in the operation state among the plurality of heaters is increased. Further, as the output of the heater in the operation state among the plurality of heaters is increased, the output of the heating portion 20 is increased.

An operation state of the plurality of heaters, such as the upper heater 22, the lower heater 24 and the convection heater 26 according to an embodiment, included in the heating portion 20 is switched between a continuous operation state, in which the upper heater 22, the lower heater 24 and the convection heater 26 are continuously operated, and an intermittent operation state in which the upper heater 22, the lower heater 24 and the convection heater 26 are intermittently operated. The upper heater 22, the lower heater 24 and the convection heater 26 in the intermittent operation state are operated for a predetermined time with a predetermined operation period. The upper heater 22, the lower heater 24, and the convection heater 26 may change a ratio of the operation time and the operation period in the intermittent operation state.

<Temperature Sensor>

The temperature sensor 30 may be provided inside the cooking chamber 12 to detect a temperature of the food material.

For example, the temperature sensor 30 may be configured to detect an internal temperature of the food material. The temperature sensor 30 according to an embodiment detects a surface temperature of the food material in a non-contact manner. For example, the temperature sensor 30 may include a plurality of infrared sensors. The temperature sensor 30 may be installed on the upper surface of the cooking chamber 12. The temperature sensor 30 scans almost all areas of the upper surface of the tray 18 to detect a heat distribution of a target area including the food material. The detection result of the temperature sensor 30 (information indicating the surface temperature of the target area including the food material) may be transmitted to the controller 90.

<Three-Dimensional (3D) Sensor>

The 3D sensor 40 detects a 3D shape of the food material placed in the cooking chamber 12 so as to obtain 3D information representing the 3D shape of the food material. For example, the 3D information includes 3D coordinates indicating the 3D shape of the food material. The 3D sensor 40 is an example of a food material information detector. For example, the 3D sensor 40 may include a known three-dimensional measurement device, such as a time of flight (TOF) camera or a stereo camera. The detection result (3D information of the food material) of the 3D sensor 40 may be transmitted to the controller 90.

<Imager>

The imager 50 images the food material placed in the cooking chamber 12 so as to obtain an imaged image of the food material F. That is, the imager 50 may obtain an image of the food material by imaging the inside of the cooking chamber 12. The imager 50 is an example of the food material information detector. For example, the imager 50 includes a known imaging device, such as a charge coupled device (CCD) camera or a complementary metal oxide semiconductor (CMOS) camera. The imager 50 may be arranged at a central position in the front and rear direction on the upper left side of the housing 10 so as to image the food material in the cooking chamber 12. The imaged image obtained by the imager 50 is output to the controller 90.

<Chamber Temperature Sensor>

The chamber temperature sensor 60 detects a temperature of the cooking chamber 12. The chamber temperature sensor 60 is installed in the cooking chamber 12. For example, the chamber temperature sensor 60 detects a temperature of the air at an installation location in the cooking chamber 12. For example, the chamber temperature sensor 60 includes a known temperature sensor, such as a thermistor. The detection result (information indicating the temperature in the cooking chamber 12) of the chamber temperature sensor 60 may be transmitted to the controller 90.

<Display and Manipulator>

The display 70 displays information on heating-cooking. The manipulator 72 receives a user's manipulation related to the heating-cooking. The display 70 and the manipulator 72 may be provided above the opening of the cooking chamber 12 as a control panel 74.

For example, the control panel 74 may be provided as a display device including a touch panel. The manipulator 72 according to an embodiment may be provided as a touch panel. In this case, the manipulator 72 may include a physical manipulation button and a dial-type switch.

The control panel 74 displays heating-cooking setting information as information about heating-cooking. For example, the setting information of heating-cooking may include an output level of the heating portion 20, a time required for heating-cooking, and an operation mode of heating-cooking such as a manual cooking operation or an automatic cooking operation. In addition, the control panel 74 may receive setting information for heating-cooking or start and stop heating-cooking inputs through a user's touch manipulation. Information input through the control panel 74 may be transmitted to the controller 90.

<Storage>

The storage 80 stores various types of information. For example, the storage 80 includes a known storage device. For example, the storage device may include a hard disk drive (HDD), a solid state drive (SSD), and the like. The storage 80 is built or installed in the cooking apparatus 1. The storage 80 may alternatively or additionally be provided as an external storage device provided outside the housing 10. The storage 80 stores a food material image prepared for each type of food materials. The food material image is an image obtained by imaging a food material.

Further, the storage 80 stores heating-cooking conditions prepared for each combination of different types and sizes of the food material. For example, the size of the food material may include at least one of a thickness of the food material, a volume of the food material, a surface area of the food material, and a weight of the food material. The size of the food material may be obtained by calculation based on the food material image. The heating-cooking condition is a condition for cooking the food material with a preferred texture and taste in the heating-cooking of the food material. For example, the heating-cooking conditions may include a target reach temperature of an internal temperature of a food material and a target rate of internal temperature rise of a food material. The term "heating-cooking condition" refers to a heating condition and/or a cooking condition. For example, the heating-cooking condition may be a condition to heat the food material and/or a condition to cook the food material.

The heating-cooking conditions may include a temperature profile indicating a target value of a temperature transition at the time of heating a food material. The temperature profile includes a target rate of temperature rise and a target reach temperature. For example, the target rate of temperature rise may be a rate at which the internal temperature of the food material rises toward the target internal temperature when the internal temperature of the food material is in the range of from greater than or equal to 50° C., to less than or equal to 60° C. The target reach temperature is a target temperature to which the internal temperature of the food material is required to be reached at the end of heating-cooking.

<Controller>

The controller 90 comprehensively controls the operation of the cooking apparatus 1. As shown in FIG. 4, the controller 90 is electrically connected to the heating portion 20, the temperature sensor 30, the 3D sensor 40, the imager 50, the chamber temperature sensor 60, the display 70, the manipulator 72, and the storage 80 to communicate therewith. The controller 90 is a controller based on a known microcomputer. The controller 90 includes a processor 92 configured to execute a program, and a memory 94 configured to store various programs and data executed on the processor 92. In other words, the controller 90 includes at least one memory 94 in which various data for executing a program and a program performing the above-described operation or an operation to be described later are stored, and at least one processor 92 executing the stored program.

The controller 90 executes a program stored in the memory 94 so as to control the heating portion 20 based on information received through the control panel 74 and information obtained through the temperature sensor 30, the 3D sensor 40, the imager 50, and the chamber temperature sensor 60.

For example, the controller 90 is configured to control the upper heater 22, the lower heater 24 and the convection heater(s) 26 to allow at least two heating operations to be operated sequentially according to a heating-cooking condition according to the type of the food material.

For example, the controller 90 may adjust the output of the heating portion 20 based on the internal temperature of the food material and the heating-cooking conditions.

The controller 90 may determine the type and size of the food material based on the 3D shape of the food material and the image of the food material.

For example, the controller 90 recognizes the type of food material placed in the cooking chamber 12 based on the 3D information of the food material received from the 3D sensor 40 and the imaged image of the food material received from the imager 50. For example, the controller 90 compares the food materials included in the imaged image with the food material included in each of the plurality of food material images stored in the storage 80 to determine a similarity between the imaged image and the image stored in the storage 80. The controller 90 recognizes the type of the food material, which is included in the food material image with the highest similarity, as the type of the food material placed in the cooking chamber 12.

In addition, the controller 90 determines a suitability of the food type based on the 3D information of the food material received from the 3D sensor 40. In addition, the controller 90 estimates the size of the food material based on the 3D information of the food material received from the 3D sensor 40 and the imaged image of the food material received from the imager 50. For example, the controller 90 estimates a two-dimensional (2D) size of the food material from the imaged image, and estimates a thickness of the food material from the 3D information of the food material F. The controller 90 sets the heating-cooking conditions according to the estimated type and size of the food material.

Figure 5:
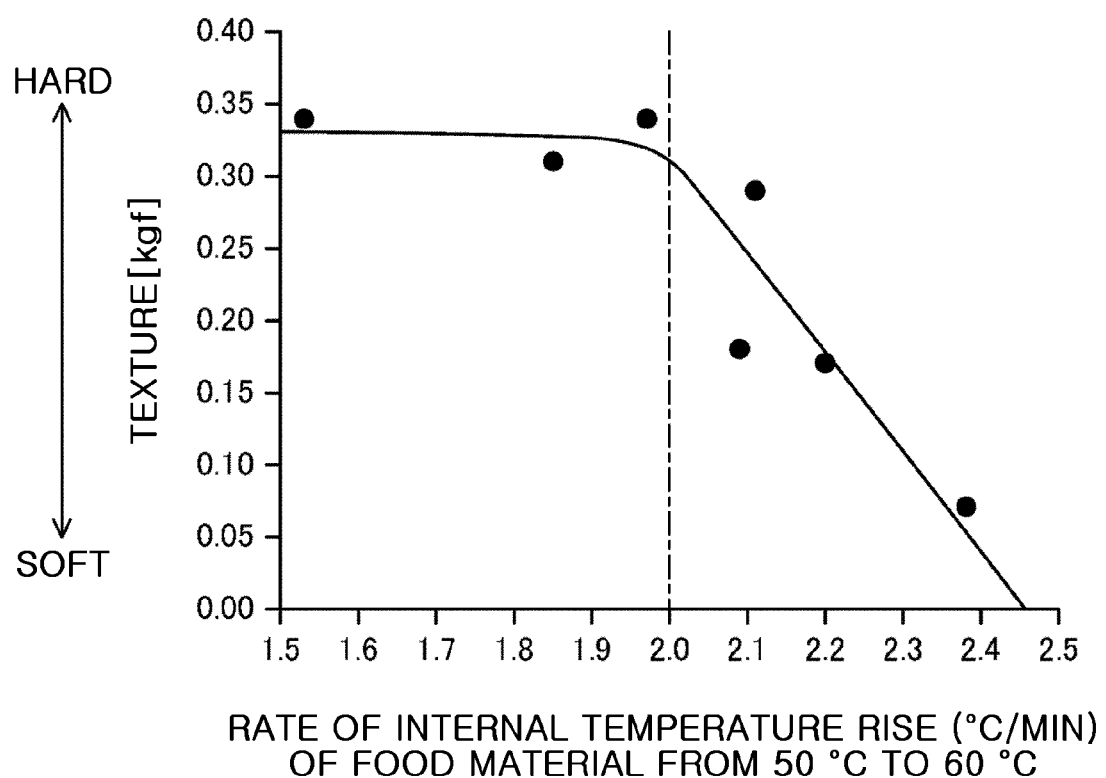
FIG. 5 is a graph illustrating a relationship between a rate of temperature rise, and a texture of a food material when an internal temperature of the food material is between 50° C. and 60° C. in the cooking apparatus according to an embodiment of the disclosure.

FIG. 5 is a graph illustrating a relationship between a rate of temperature rise and a texture of the food material F when an internal temperature of the food material F is between 50° C. and 60° C. in the cooking apparatus 1 according to an embodiment of the disclosure.

FIG. 5 illustrates data obtained by measuring a texture of a plurality of samples, which is heated by varying a rate of an internal temperature rise in a corresponding temperature range, by a texture analyzer with respect to potatoes.

Vegetables, which are a type of food materials, cause a phenomenon (hardening phenomenon) that is mainly hardened in the temperature range of from greater than or equal to 50° C., to less than or equal to 60° C. when the heating-cooking is performed. This is because a cell wall of vegetables is destroyed and moisture easily escapes, and specific enzymes such as pectinase are active in the corresponding temperature range. Further, a softness of the vegetables changes according to the rate of the internal temperature rise of the vegetables in the temperature range of from greater than or equal to 50° C., to less than or equal to 60° C.

For example, as illustrated in FIG. 5, when the rate of the internal temperature rise of vegetables is less than about 2.0° C./min, the vegetables are relatively hard. However, when the rate of the internal temperature rise of vegetables is greater than or equal to about 2.0° C./min, the vegetables are softer as the rate of the internal temperature rise is increased. For this reason, the target rate of temperature rise according to an embodiment is set to be greater than or equal to 2.0° C./min to adjust the softness of vegetables according to the type of vegetables. In this case, FIG. 5 exemplifies data about potatoes, and the same trend is confirmed in other root vegetables and leafy vegetables. Root vegetables correspond to root-type vegetables such as potatoes, carrots, and lotus roots, and leafy vegetables correspond to leaf type-vegetables such as spinach, onions, and broccoli.

The target rate of temperature rise may vary according to at least the type of vegetables, such as root vegetables, leafy vegetables, or fruits and vegetables. That is, the target rate of temperature rise may vary according to the type of food materials. Although the food material is root vegetables, the target rate of temperature rise may vary according to the type of root vegetables such as potato, carrot, or lotus root. Further, although the food material is leafy vegetables, the target rate of temperature rise may vary according to the type of leafy vegetables such as spinach, onion, or broccoli. Further, although the food material is fruits and vegetables, the target rate of temperature rise may vary according to the type of fruits and vegetables such as tomatoes, eggplants, or cucumbers.

Figure 6:
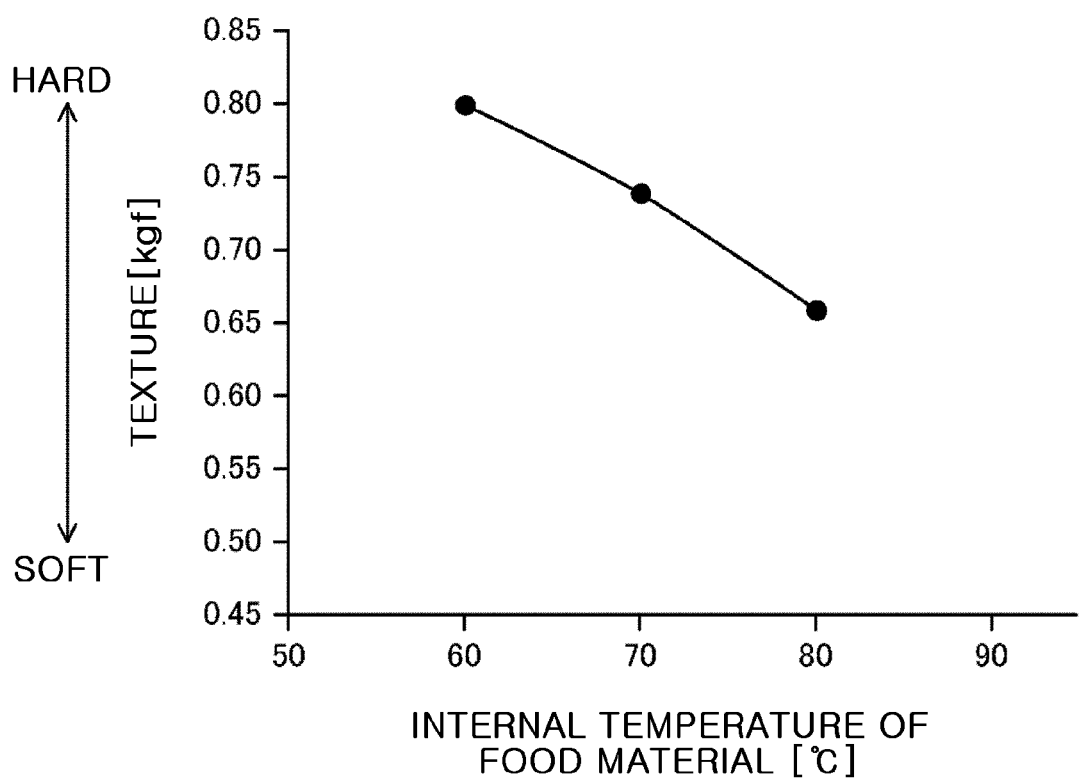
FIG. 6 is a graph illustrating a relationship between a reach point of an internal temperature of a food material and a texture of the food material in the cooking apparatus according to an embodiment of the disclosure.

FIG. 6 is a graph illustrating a relationship between a reach point of an internal temperature of a food material F and a texture of the food material in the cooking apparatus 1 according to an embodiment of the disclosure.

FIG. 6 illustrates data obtained by measuring a texture of a plurality of samples, which is with different internal temperatures reached by heating with respect to potatoes, by a texture analyzer. Vegetables cause a phenomenon (softening phenomenon) that is mainly softened in a temperature range of more than 60° C. in the heating-cooking. It is considered that this is because the specific enzyme does not function and the pectin contained in the cell wall is decomposed by heat. The softness of vegetables changes according to a temperature reached in the range in which the internal temperature of the vegetables is greater than 60° C.

For example, as illustrated in FIG. 6, in the range in which the internal temperature of the vegetables is greater than 60° C., the softness of vegetables is increased as the internal temperature of the vegetables is increased. For this reason, the target reach temperature according an embodiment is set to be greater than or equal to 60° C. to adjust the softness of vegetables according to the type of vegetables. In this case, FIG. 6 exemplifies data about potatoes, and the same trend is confirmed in other root vegetables and leafy vegetables.

The controller 90 adjusts the output of the heating portion 20 based on the heating-cooking conditions. When the food material is vegetables (root vegetables, leafy vegetables, or fruits and vegetables), the controller 90 performs a first temperature range heating operation and a second temperature range heating operation according to the heating-cooking conditions. In addition, the controller 90 performs a third temperature range heating operation if necessary.

The first temperature range heating operation is a heating operation in response to the internal temperature of the food material being less than 50° C. The second temperature range heating operation is a heating operation in response to the internal temperature of the food material being greater than or equal to 50° C., but less than or equal to 60° C. In the second temperature range heating operation, a target rate of temperature rise is used as a rate, in which the internal temperature of the food material is increased to a target internal temperature.

For example, the controller 90 may control the heating portion 20 to perform the first temperature range heating operation until the internal temperature of the food material reaches a first set temperature (e.g., 50° C.). Thereafter, the controller 90 may control the heating portion 20 to perform the second temperature range heating operation in which the rate of internal temperature rise of the food material follows the target rate of temperature rise in a range in which the internal temperature of the food material is greater than or equal to the first set temperature (e.g., 50° C.), but less than or equal to a second set temperature (e.g., 60° C.).

The third temperature range heating operation is a heating operation in response to the internal temperature of the food material being greater than 60° C. Whether or not to perform the third temperature range heating operation is determined by the target reach temperature included in the heating-cooking conditions.

For example, the controller 90 may control the heating portion 20 to perform the third temperature range heating operation from when the internal temperature of the food material reaches the second set temperature (e.g., 60° C.) until the internal temperature of the food material reaches the target reach temperature (e.g., greater than 60° C.).

The controller 90 recognizes a food material area, in which the food material is placed in the cooking chamber 12, based on the imaged image of the food material received from the imager 50. Further, the controller 90 obtains a surface temperature of the food material area as a surface temperature of the food material based on the surface temperature of the target area received from the temperature sensor 30. Further, the controller 90 estimates the internal temperature of the food material based on the surface temperature of the food material. In other words, the controller 90 may determine the surface temperature of the food material based on the output of the temperature sensor 30, and determine the internal temperature of the food material based on the surface temperature of the food material.

The controller 90 performs switching from the first temperature range heating operation to the second temperature range heating operation and from the second temperature range heating operation to the third temperature range heating operation based on the estimated internal temperature of the food material.

For example, in response to the estimated internal temperature of the food material reaching 50° C. during the first temperature range heating operation, the controller 90 terminates the first temperature range heating operation and starts the second temperature range heating operation. In response to the estimated internal temperature of the food material reaching 60° C. during the second temperature range heating operation, the controller 90 terminates the second temperature range heating operation. The controller 90 according to an embodiment starts the third temperature range heating operation in response to the target reach temperature being greater than 60° C. In response to the estimated internal temperature of the food material reaching the target reach temperature during the third temperature range heating operation, the controller 90 terminates the third temperature range heating operation.

—Operation of Cooking Apparatus—

Figure 7:
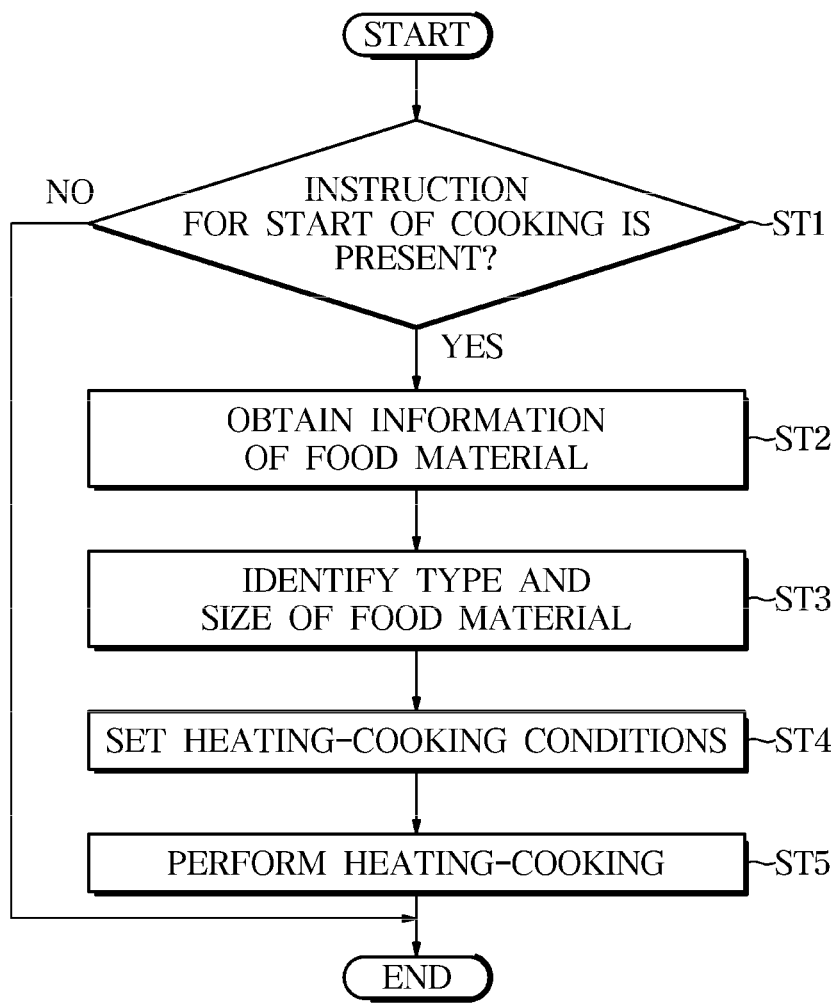
FIG. 7 is a flowchart illustrating a control method when the cooking apparatus according to an embodiment of the disclosure performs heating-cooking according to a type and size of a food material.
Figure 8:
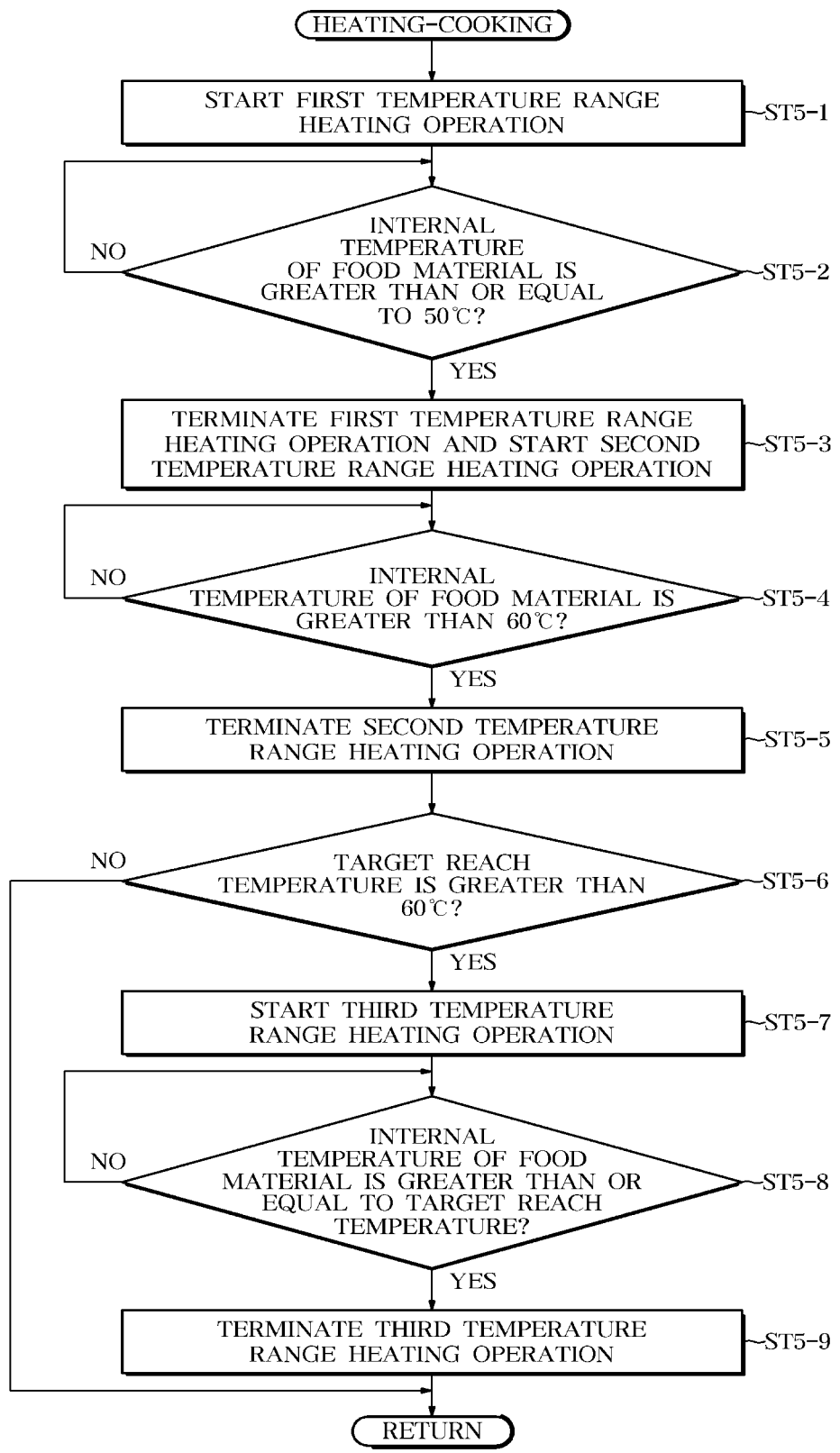
FIG. 8 is a flowchart illustrating a control method when the cooking apparatus according to an embodiment of the disclosure performs heating-cooking according to the type and size of the food material.

FIGS. 7 and 8 are flowcharts illustrating a control method when the cooking apparatus 1 according to an embodiment of the disclosure performs the heating-cooking according to the type and size of the food material.

In order to cook a food material using the cooking apparatus 1, a user first puts the food material into the cooking chamber 12. Next, the user executes a manipulation for setting a cooking method of the food material through the control panel 74. The user also executes a manipulation for instructing the start of heating-cooking through the control panel 74. In this case, the cooking apparatus 1 automatically performs the heating-cooking on the food material F placed in the cooking chamber 12.

As illustrated in FIG. 7, the controller 90 determines whether or not the manipulation for instructing the start of heating-cooking is input from the user (ST1). whether or not the manipulation for instructing the start of heating-cooking is input is determined based on the manipulation on the control panel 74. In response to determining that the manipulation for instructing the start of heating-cooking is not input (no in ST1), the controller 90 may terminate a process without starting the heating-cooking.

In response to determining that the manipulation for instructing the start of heating-cooking is input (yes in ST1), the controller 90 may receive information from the temperature sensor 30, the 3D sensor 40, the imager 50, and the chamber temperature sensor 60 (ST2). In response to receiving the information from the temperature sensor 30, the 3D sensor 40, the imager 50, and the chamber temperature sensor 60, the controller 90 recognizes a type and size of the food material based on the 3D information of the food material received from the 3D sensor 40, and the imaged image of the food material received from the imager 50 (ST3).

In response to recognizing the type and size of the food material, the controller 90 sets heating-cooking conditions of the food material based on the type and size of the food material (ST4). As the heating-cooking conditions of the food material, heating-cooking conditions suitable for the type and size of the food material are selected from the plurality of heating-cooking conditions stored in the storage 80. In response to a degree of cooking of the food material being received from the control panel 74, the heating-cooking conditions are selected in consideration of the degree of cooking as well.

The controller 90 performs the heating-cooking on the food material according to the set heating-cooking conditions (ST5). During the performance of the heating-cooking on the food material, the controller 90 estimates and monitors an internal temperature of the food material based on a surface temperature of the food material received from the temperature sensor 30. The controller 90 heats the food material by driving at least one of the upper heater 22, the lower heater 24, and the convection heater 26 to allow the internal temperature of the food material to follow the temperature profile included in the heating-cooking conditions.

For example, as illustrated in FIG. 8, when the food material is vegetables (root vegetables, leafy vegetables, or fruits and vegetables), the controller 90 starts the first temperature range heating operation (ST5-1). During the first temperature range heating operation, the controller 90 drives the heating portion 20 with a predetermined output according to the heating-cooking conditions, so as to heat the food material in the cooking chamber 12. During the first temperature range heating operation, the controller 90 determines whether the internal temperature of the food material is greater than or equal to 50° C. or not (ST5-2). In response to determining that the internal temperature of the food material is less than 50° C. (no in ST5-2), the controller 90 continues the first temperature range heating operation.

In addition, in response to determining that the internal temperature of the food material is greater than or equal to 50° C. (yes in ST5-2), the controller 90 terminates the first temperature range heating operation and starts the second temperature range heating operation (ST5-3). During the second temperature range heating operation, the controller 90 heats the food material by driving the heating portion 20 with the pre-set output to implement the target rate of temperature rise according to the heating-cooking conditions. Accordingly, the internal temperature of the food material in the cooking chamber 12 is increased at the rate of 2.0° C./min. In this case, the rate of internal temperature rise of the food material may vary according to the type of the food material.

In the second temperature range heating operation, the destruction of the cell wall of the food material (vegetables) is promoted. During the second temperature range heating operation, the controller 90 determines whether the internal temperature of the food material is greater than or equal to 60° C. (ST5-4). In response to determining that the internal temperature of the food material is less than or equal to 60° C. (no in ST5-4), the controller 90 continues the second temperature range heating operation. In addition, in response to determining that the internal temperature of the food material is greater than 60° C. (yes in ST5-4), the controller 90 terminates the second temperature range heating operation (ST5-5).

Next, the controller 90 determines whether or not the target reach temperature included in the heating and cooking conditions is 60° C. or not (ST5-6). In response to the target reach temperature being 60° C. (no in ST5-6), the controller 90 terminates the heating-cooking. In response to the target reach temperature being greater than 60° C. (yes in ST5-6), the controller 90 starts the third temperature range heating operation (ST5-7). During the third temperature range heating operation, the controller 90 heats the food material in the cooking chamber 12 by driving the heating portion 20 with the pre-set output to allow the internal temperature of the food material to reach the target reach temperature according to the heating-cooking conditions.

During the third temperature range heating operation, the pectin contained in the cell wall of vegetables is decomposed by heat. During the third temperature range heating operation, the controller 90 determines whether or not the internal temperature of the food material F reaches the target reach temperature (ST5-8). In response to determining that the internal temperature of the food material F does not reach the target reach temperature (no in ST5-8), the controller 90 continues the third temperature range heating operation. In response to determining that the internal temperature of the food material F reaches the target reach temperature (yes in ST5-8), the controller 90 terminates the third temperature range heating operation (ST5-9).

As mentioned above, in response to the internal temperature of the food material reaching the target reach temperature, the controller 90 terminates the heating-cooking performed by the heating portion 20. The controller 90 completes the heating-cooking of the food material. In response to the completion of the heating-cooking of the food material, the controller 90 notifies the user of the completion of the heating-cooking, for example, by lighting of a lamp provided as the display 70 on the control panel 74, a buzzer sound provided in the cooking apparatus 1, and the like.

—Example of Heating-Cooking Using Cooking Apparatus—

Hereinafter, a case of heating-cooking of leafy vegetables Le and a case of heating-cooking of root vegetables Ro will be described as examples of cooking using the cooking apparatus 1.

<Heating-Cooking of Leafy Vegetables>

Figure 9:
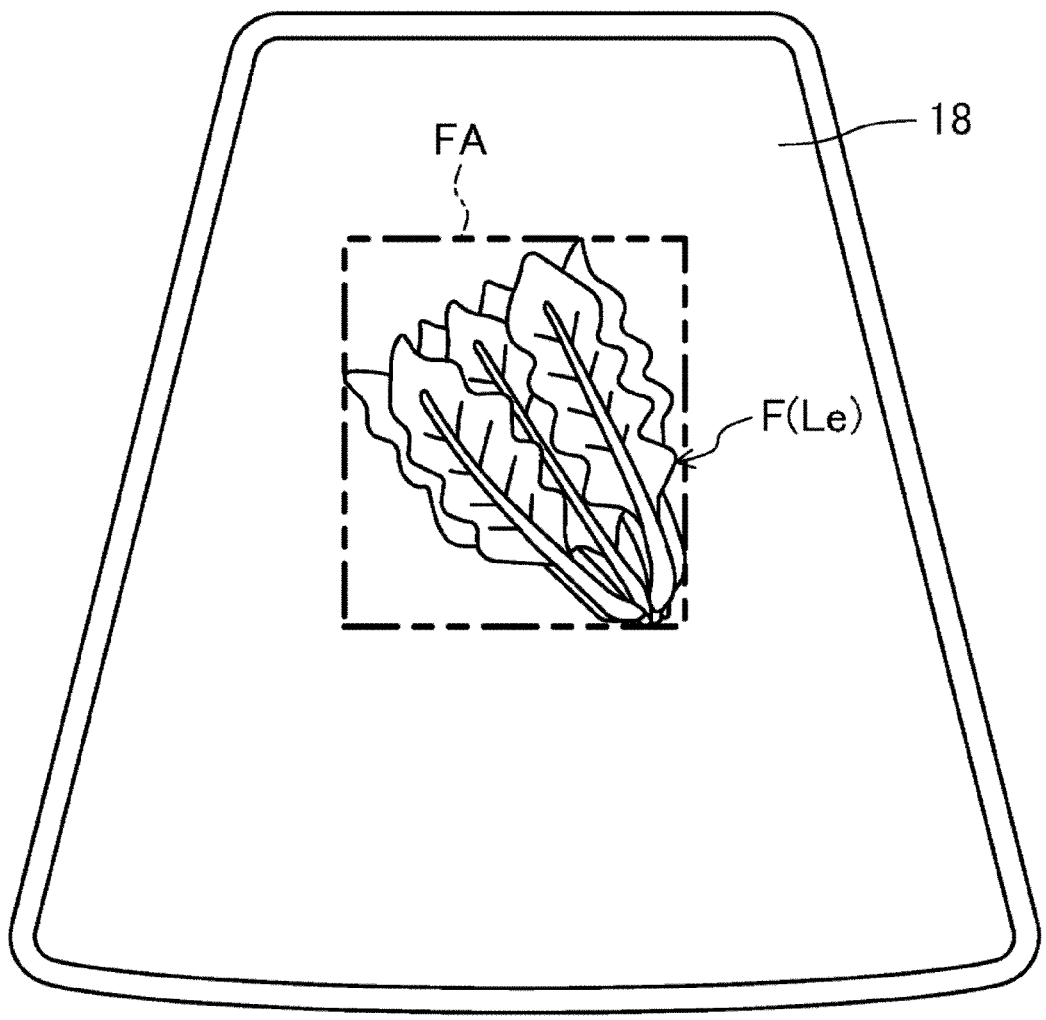
FIG. 9 is a view illustrating an image of leafy vegetables in the cooking chamber obtained by an imager of the cooking apparatus according to an embodiment of the disclosure.
Figure 10:
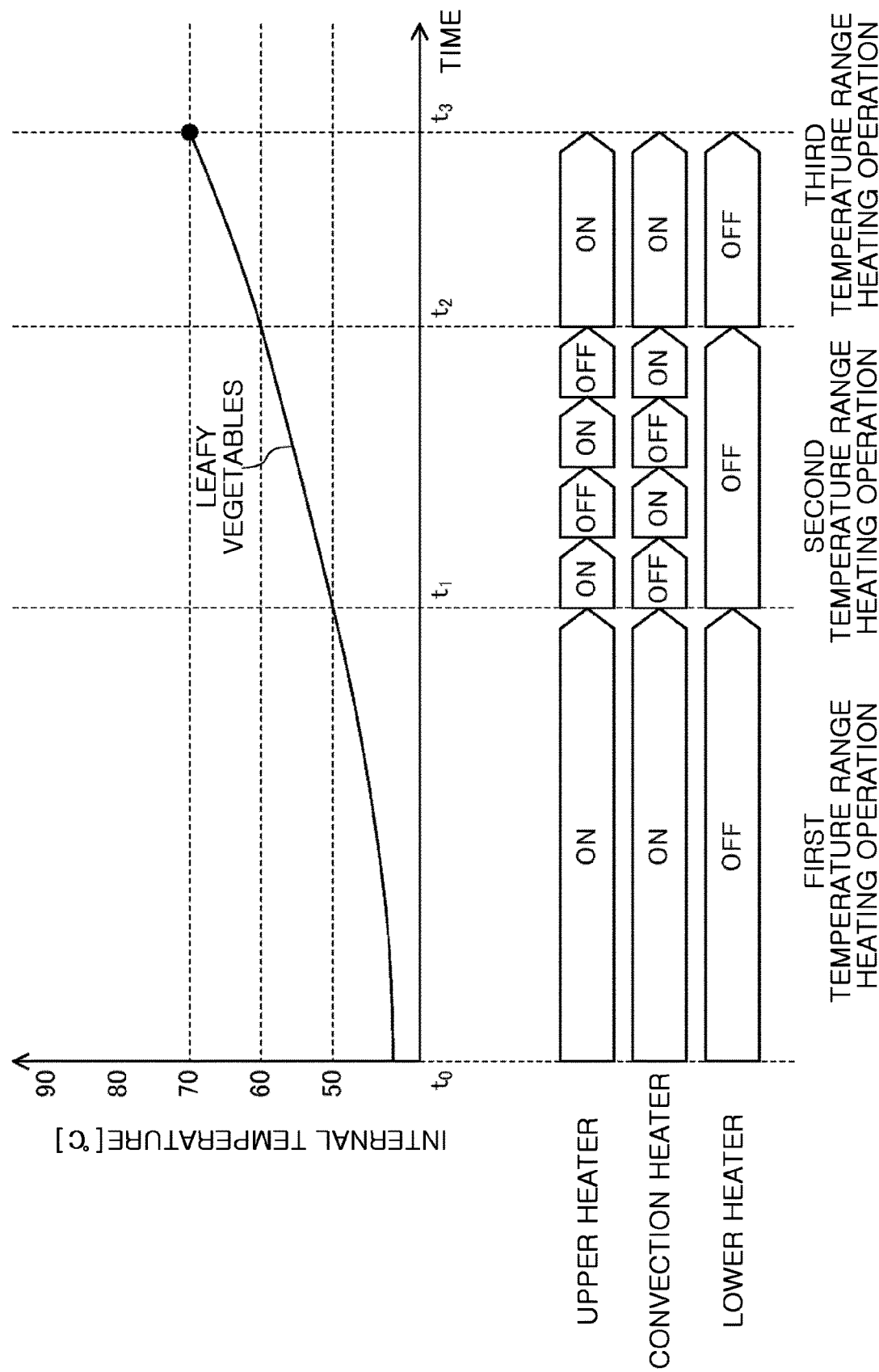
FIG. 10 is a timing chart illustrating a case in which the cooking apparatus according to an embodiment of the disclosure performs a heating operation on leafy vegetables.

FIG. 9 is a view illustrating an image of leafy vegetables Le in the cooking chamber 12 obtained by the imager 50 of the cooking apparatus 1 according to an embodiment of the disclosure, and FIG. 10 is a timing chart illustrating a case in which the cooking apparatus 1 according to an embodiment of the disclosure performs the heating operation on leafy vegetables Le.

Referring to FIG. 9, in response to a manipulation for instructing the start of the heating-cooking being executed on the control panel 74 by a user after the leafy vegetables Le is put inside the cooking chamber 12, the controller 90 recognizes the type (leafy vegetables Le or a specific type of leafy vegetables Le) and the size of the food material F placed in the cooking chamber 12 (e.g., on the tray 18) based on the 3D information of the food material received from the 3D sensor 40 and the imaged image of the food material received from the imager 50, and at the same time, the controller 90 recognizes a food material area FA in which the food material F is arranged, and obtains a surface temperature of the food material F.

Referring to FIG. 10, in the case of the heating-cooking of the leafy vegetables Le using the cooking apparatus 1, the first temperature range heating operation, the second temperature range heating operation, and the third temperature range heating operation are performed in the cooking apparatus 1. The leafy vegetables Le corresponding to an object to be cooked includes spinach, or Japanese mustard spinach, in the example of FIGS. 9-10. In this case, the target rate of temperature rise may be set to 2.1° C./min, and the target reach temperature may be set to 70° C. However, the disclosure is not limited to spinach or Japanese mustard spinach, and other leafy vegetables may be cooked by the cooking apparatus 1 according to the method of operation disclosed herein.

The first temperature range heating operation starts at a time t0 in which a start instruction of the heating-cooking is input, and ends at a time t1 in which the internal temperature of the food material F reaches 50° C. In the first temperature range heating operation, the heating portion 20 is driven to heat the leafy vegetables Le. For example, in the first temperature range heating operation, the upper heater 22 and the convection heater 26 are driven in the continuous operation state, respectively, and the lower heater 24 is not driven. The operation state of the heating portion 20 in the first temperature range heating operation is not limited thereto, and at least one of the upper heater 22, the lower heater 24, and the convection heater 26 may be driven in the continuous operation state or the intermittent operation state so as to increase the internal temperature of the food material F to 50° C.

The second temperature range heating operation starts at the time t1 in which the internal temperature of the food material F reaches 50° C., and ends at a time t2 in which the internal temperature of the food material F reaches 60° C. In the second temperature range heating operation, the heating portion 20 is driven to heat the leafy vegetables Le. For example, in the second temperature range heating operation, the upper heater 22 and the convection heater 26 are driven in the intermittent operation state, respectively, and the lower heater 24 is not driven. For example, in the second temperature range heating operation, the upper heater 22 and the convection heater 26 may be operated in an alternating fashion such that when the upper heater 22 is on, the convection heater 26 is off, and when the convection heater is on the upper heater 22 is off. Each duration of time that the upper heater 22 and the convection heater 26 may be operated in the second temperature range heating operation may be equal and a total duration of time that the upper heater 22 and the convection heater 26 may be respectively operated in the second temperature range heating operation may be the same. The operation state of the heating portion 20 in the second temperature range heating operation is not limited thereto, and at least one of the upper heater 22, the lower heater 24, and the convection heater 26 may be driven in the continuous operation state or the intermittent operation state so as to increase the internal temperature of the food material F to 60° C., and to allow the rate of internal temperature rise of the leafy vegetables Le to be the target rate of temperature rise.

The third temperature range heating operation starts at the time t2 in which the internal temperature of the food material F reaches 60° C., and ends at a time t3 in which the internal temperature of the food material F reaches the target reach temperature (70° C. in the embodiment). In the third temperature range heating operation, the heating portion 20 is driven to heat the leafy vegetables Le. For example, in the third temperature range heating operation, the upper heater 22 and the convection heater 26 are driven in the continuous operation state, respectively, and the lower heater 24 is not driven. The operation state of the heating portion 20 in the third temperature range heating operation is not limited thereto, and at least one of the upper heater 22, the lower heater 24, and the convection heater 26 may be driven in the continuous operation state or the intermittent operation state so as to allow the internal temperature of the food material F to be the target reach temperature.

By performing the heating-cooking in the cooking apparatus 1 as described above, the leafy vegetables Le may be cooked with a moderately soft and preferred texture and taste.

<Heating-Cooking of Root Vegetables>

Figure 11:
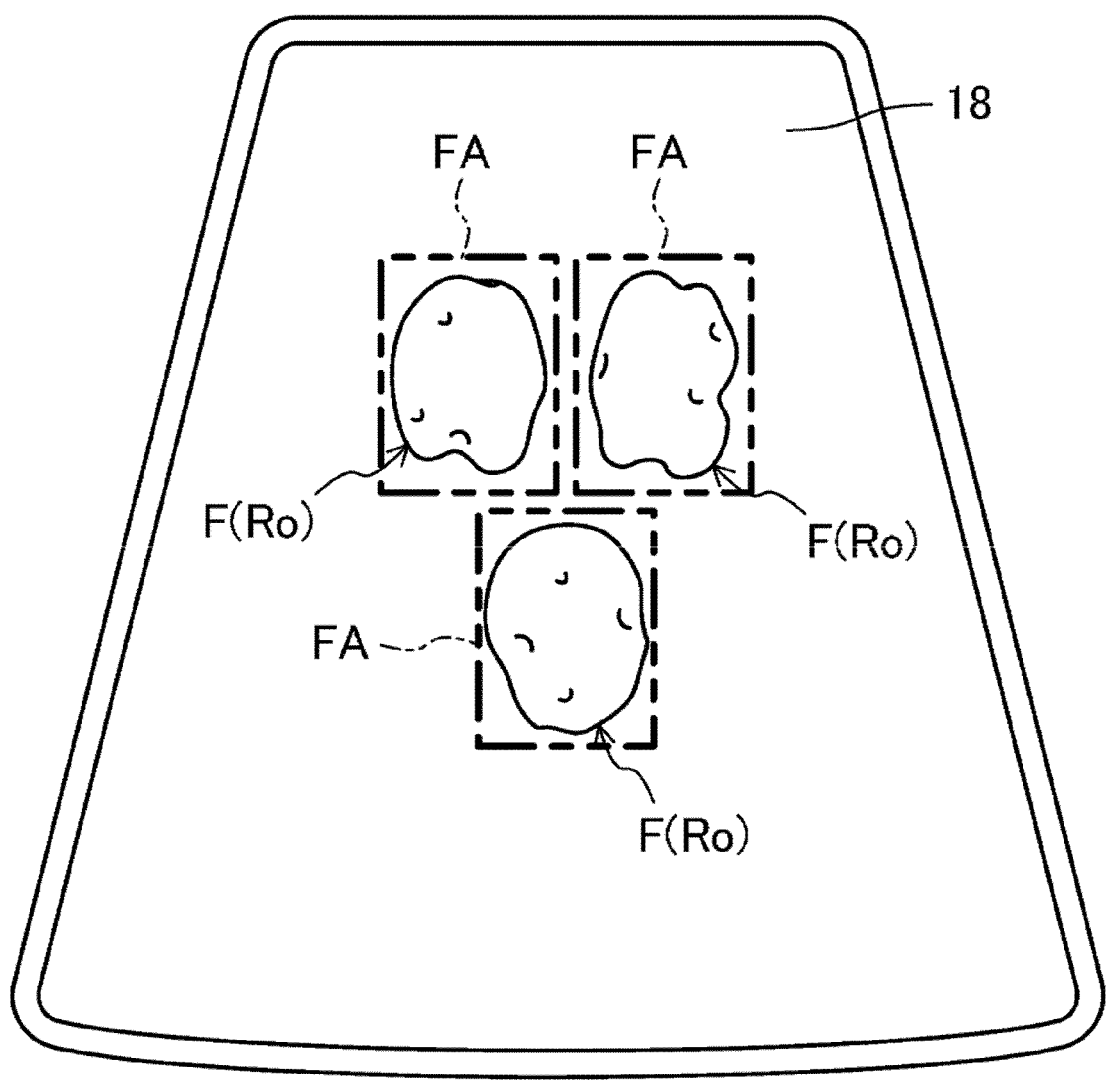
FIG. 11 is a view illustrating an image of root vegetables in the cooking chamber obtained by the imager of the cooking apparatus according to an embodiment of the disclosure.
Figure 12:
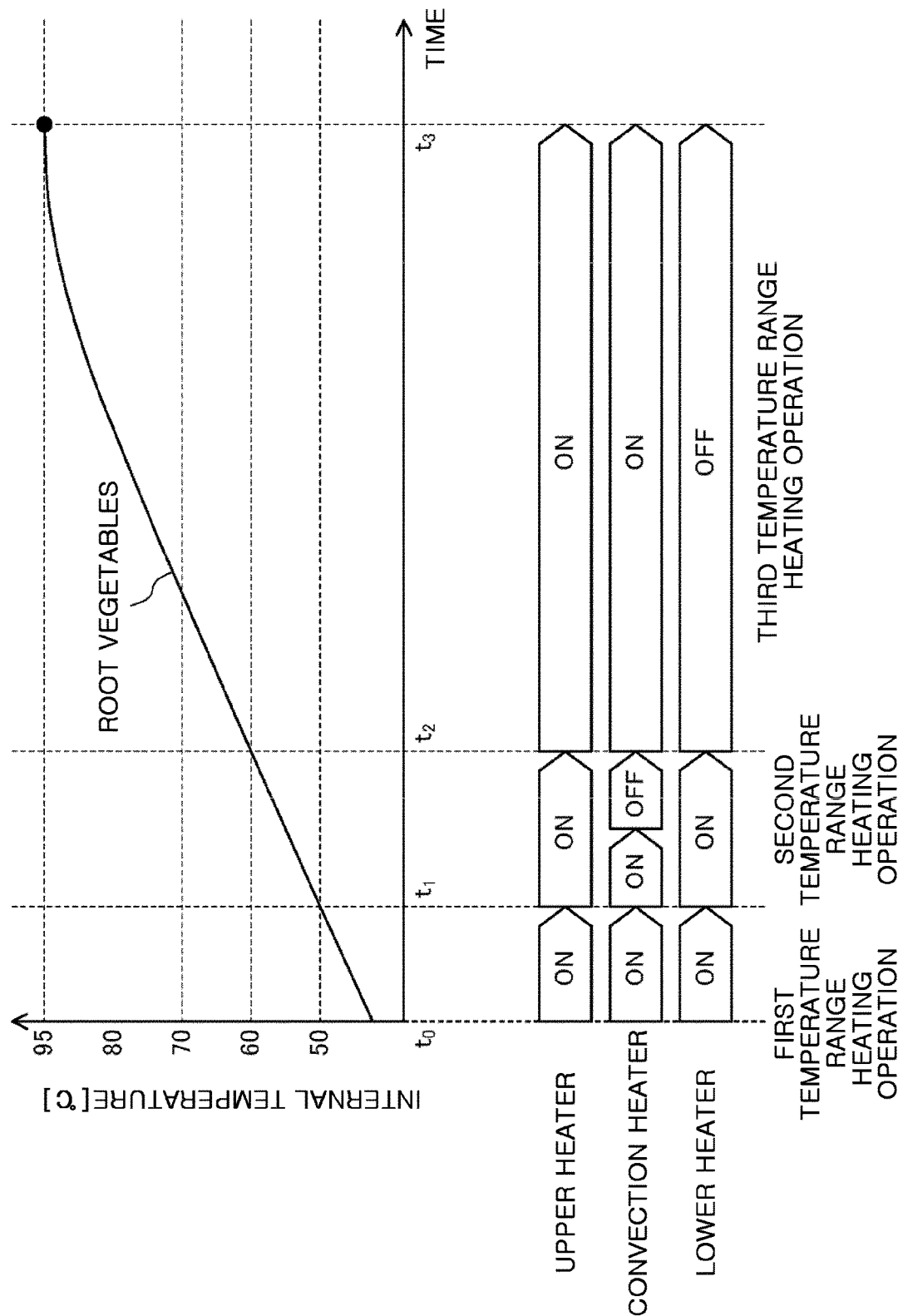
FIG. 12 is a timing chart illustrating a case in which the cooking apparatus according to an embodiment of the disclosure performs a heating operation on root vegetables.

FIG. 11 is a view illustrating an image of root vegetables Ro in the cooking chamber 12 obtained by the imager 50 of the cooking apparatus 1 according to an embodiment of the disclosure, and FIG. 12 is a timing chart illustrating a case in which the cooking apparatus 1 according to an embodiment of the disclosure performs a heating operation on root vegetables Ro.

Referring to FIG. 11, in response to a manipulation for instructing the start of the heating-cooking being executed on the control panel 74 by a user after the root vegetables Ro is put inside the cooking chamber 12, the controller 90 recognizes the type (root vegetables Ro or a specific type of root vegetables Ro) and the size of the food material F placed in the cooking chamber 12 based on the 3D information of the food material received from the 3D sensor 40 and the imaged image of the food material received from the imager 50, and at the same time, the controller 90 recognizes a food material area FA in which the food material F is arranged, and obtains a surface temperature of the food material F, as illustrated in FIG. 11.

Referring to FIG. 12, in the case of the heating-cooking of the root vegetables Ro using the cooking apparatus 1, the first temperature range heating operation, the second temperature range heating operation, and the third temperature range heating operation are performed in the cooking apparatus 1. The root vegetables Ro corresponding to an object to be cooked includes potatoes and carrots in the example of FIGS. 11-12. In this case, the target rate of temperature rise may be set to 2.2° C./min, and the target reach temperature may be set to 95° C. However, the disclosure is not limited to potatoes and carrots, and other root vegetables may be cooked by the cooking apparatus 1 according to the method of operation disclosed herein.

The first temperature range heating operation starts at a time t0 in which a start instruction of the heating-cooking is input, and ends at a time t1 in which the internal temperature of the root vegetables Ro reaches 50° C. In the first temperature range heating operation, the heating portion 20 is driven to heat the root vegetables Ro. For example, in the first temperature range heating operation, the upper heater 22, the lower heater 24, and the convection heater 26 are driven in the continuous operation state. The operation state of the heating portion 20 in the first temperature range heating operation is not limited thereto, and at least one of the upper heater 22, the lower heater 24, and the convection heater 26 may be driven in the continuous operation state or the intermittent operation state.

The second temperature range heating operation starts at the time t1 in which the internal temperature of the root vegetables Ro reaches 50° C., and ends at a time t2 in which the internal temperature of the root vegetables Ro reaches 60° C. In the second temperature range heating operation, the heating portion 20 is driven to heat the root vegetables Ro. For example, in the second temperature range heating operation, the upper heater 22 and the lower heater 24 are driven in the continuous operation state, and at the same time, the convection heater 26 is driven in the intermittent operation state. The operation state of the heating portion 20 in the second temperature range heating operation is not limited thereto, and at least one of the upper heater 22, the lower heater 24, and the convection heater 26 may be driven in the continuous operation state or the intermittent operation state so as to allow the rate of internal temperature rise of the root vegetables Ro to be the target rate of temperature rise.

The third temperature range heating operation starts at the time t2 in which the internal temperature of the root vegetables Ro reaches 60° C., and ends at a time t3 in which the internal temperature of the food material F reaches the target reach temperature (95° C. in the embodiment). In the third temperature range heating operation, the heating portion 20 is driven to heat the root vegetables Ro. For example, in the third temperature range heating operation, the upper heater 22 and the convection heater 26 are driven in the continuous operation state, and the lower heater 24 is not driven. The operation state of the heating portion 20 in the third temperature range heating operation is not limited thereto, and at least one of the upper heater 22, the lower heater 24, and the convection heater 26 may be driven in the continuous operation state or the intermittent operation state so as to allow the internal temperature of the root vegetables Ro to reach the target reach temperature.

In the above examples, the case of heating-cooking of the leafy vegetables Le and the root vegetables Ro is described. However, the cooking apparatus 1 according to example embodiments may control the heating portion 20 to perform the heating-cooking on fruits and vegetables to allow the rate of the internal temperature rise of the food material F to be 2.0° C./min or more in the range in which the internal temperature of the food material F is greater than or equal to 50° C. but less than or equal to 60° C.

By performing the heating-cooking in the cooking apparatus 1 as described above, the root vegetables Ro may be cooked with a moderately soft and preferred texture and taste.

The cooking apparatus 1 according to the example embodiments disclosed herein heats the food material F to allow the rate of the internal temperature rise of the food material F to be 2.0° C./min or more in the range in which the internal temperature of the food material F is greater than or equal to 50° C. but less than or equal to 60° C. When the food material F is vegetables, the cooking apparatus may adjust the softness of the food material by increasing or reducing a softening degree of a tissue of the food material F by setting the rate of the internal temperature rise of the food material F to be 2.0° C./min or more in the range of from greater than or equal to 50° C., to less than or equal to 60° C. Accordingly, it is possible to automatically cook the food material F with a preferred texture and taste without requiring a complicated operation from a user.

The cooking apparatus 1 according to the example embodiments disclosed herein terminates the heating of the food material F in response to the internal temperature of the food material F reaching the target reach temperature set to 60° C. or greater. In a case in which the food material F is vegetables, when the internal temperature of the food material F is 60° C. or greater, the food material F is softer due to the decomposition of the pectin included in the cell wall, as the internal temperature is increased. Therefore, the cooking apparatus 1 may adjust the softness of the food material F by controlling the temperature to which the internal temperature of the food material F reaches.

In the cooking apparatus 1 according to the example embodiments disclosed herein, the target reach temperature, which is the target temperature at which the internal temperature of the food material F reaches by heating the food material F, is set based on the type of the food material F. Accordingly, when the food material F is vegetables, the cooking apparatus 1 may cook the food material F with a desired softness according to the type of the vegetables.

Figure 13:
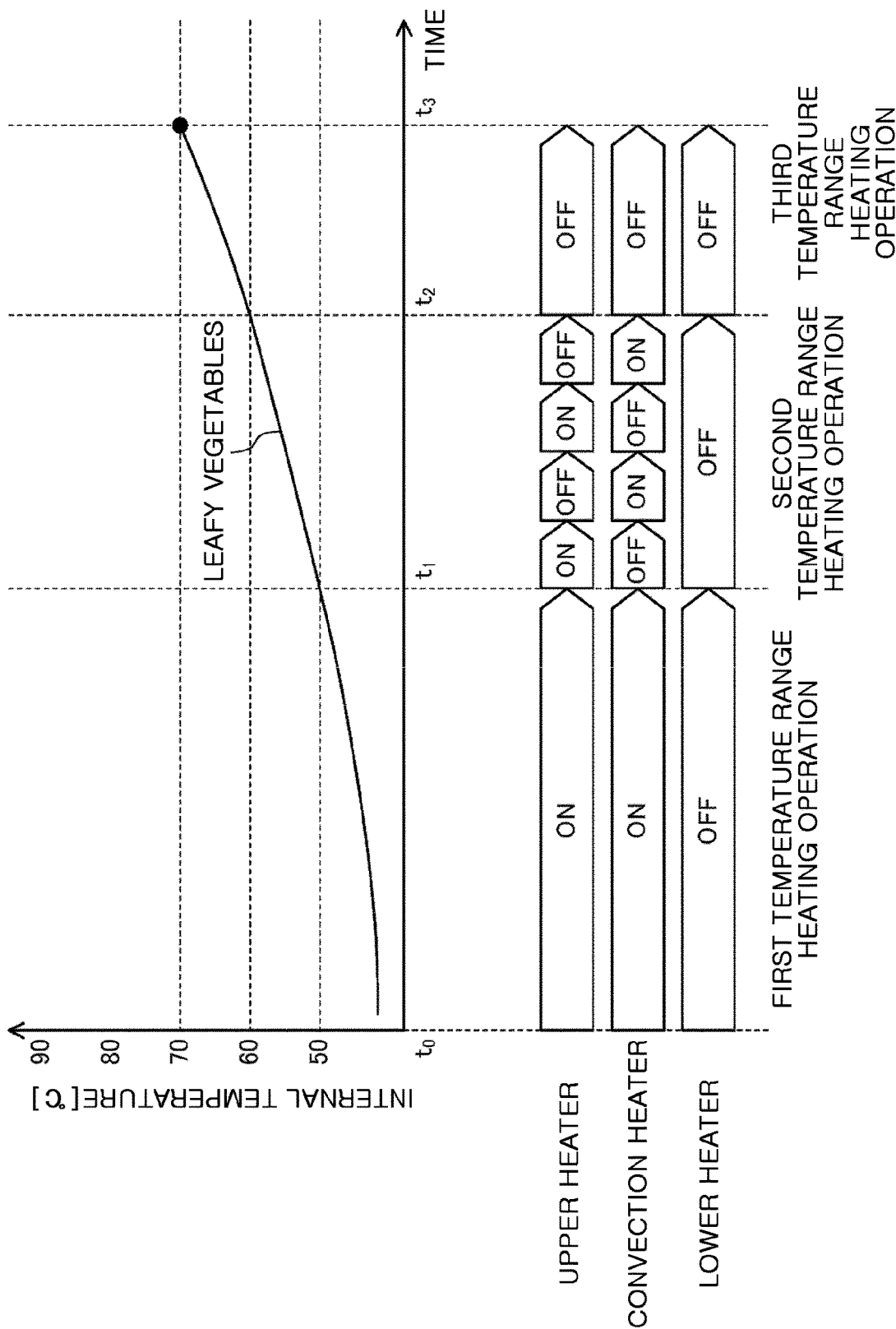
FIG. 13 is a timing chart illustrating an operation that is performed on leafy vegetables by the cooking apparatus according to an embodiment of the disclosure.

FIG. 13 is a timing chart illustrating an operation that is performed on leafy vegetables Le by the cooking apparatus 1 according to an embodiment of the disclosure.

The cooking apparatus 1 according to examples disclosed herein heats the food material F by the heating portion 20 until the internal temperature of the food material F reaches the target reach temperature in the third temperature range heating operation. On the other hand, referring to FIG. 13, in the cooking apparatus 1 according to the example, when the target reach temperature is less than or equal to a predetermined temperature (e.g., 70° C.), the controller 90 terminates heating of the food material F through the heating portion 20 before the internal temperature of the food material F reaches the target reach temperature in the third temperature range heating operation. For example, the controller 90 terminates heating of the food material F through the heating portion 20 in response to the termination of the second temperature range heating operation.

As illustrated in FIG. 13, in the case of heating-cooking of leafy vegetables Le using the cooking apparatus 1 according to the example, the cooking apparatus 1 performs the first temperature range heating operation, the second temperature range heating operation, and the third temperature range heating operation. In the example, the target reach temperature is set to 70° C.

In response to the termination of the second temperature range heating operation, the controller 90 according to the example terminates the heating of the leafy vegetables Le through the heating portion 20. That is, the upper heater 22, convection heater 26, and lower heater 24, are turned off. In the third temperature range heating operation, the leafy vegetables Le is heated to the target reach temperature by heat remaining in the cooking chamber 12. In response to the internal temperature of the leafy vegetables Le reaching the target reach temperature, the controller 90 completes the heating-cooking of the food material F. In response to the completion of the heating-cooking of the food material F, the controller 90 notifies the user of the completion of the heating-cooking, for example by lighting of a lamp and/or providing a buzzer sound, and the like.

In other words, the controller 90 controls the heating portion 20 to terminate the heating operation in response to the internal temperature of the food material reaching the second set temperature (e.g., 60° C.), and the controller 90 controls the control panel 74 to output a notification of the completion of the cooking in response to the internal temperature of the food material reaching the target reach temperature (e.g., 70° C.).

The controller 90 may determine whether to terminate the heating of the leafy vegetables Le through the heating portion 20 at an end time of the second temperature range heating operation, based on the information on the temperature of the inside of the cooking chamber 12 received from the chamber temperature sensor 60.

When the temperature of the inside of the cooking chamber 12 is high enough to allow the internal temperature of the food material F to reach the target reach temperature with residual heat, the controller 90 terminates the heating of the leafy vegetables Le through the heating portion 20 at the end time of the second temperature range heating operation. When the temperature of the inside of the cooking chamber 12 is too low to allow the internal temperature of the food material F to reach the target reach temperature with residual heat, the controller 90 performs the heating of the food material F through the heating portion 20 with the third temperature range heating operation even after the termination of the second temperature range heating operation. The controller 90 may terminate the heating of the food material F through the heating portion 20 in the middle of the third temperature range heating operation. That is, at least one of the upper heater 22, convection heater 26, and the lower heater 24 may be operated for some portion of time in the third temperature range heating operation until the controller 90 determines the residual heat will be sufficient to heat the food material F to the target reach temperature after terminating operation of all of the upper heater 22, convection heater 26, and the lower heater 24.

In the above example, the case of the heating-cooking of the leafy vegetables Le is described. However, the cooking apparatus 1 according to the example may be configured to heat root vegetables Ro and fruits and vegetables with the residual heat of the cooking chamber 12.

In the cooking apparatus 1 of the example of FIG. 13, the food material F is heated by the residual heat in the cooking chamber 12 after the termination of the heating of the food material F through the heating portion 20. It is possible to allow the internal temperature to reach the target reach temperature with the residual heat of the cooking chamber 12 according to the type of the food material F such as whether the food material F is leafy vegetables Le or fruits and vegetables. Accordingly, it is possible to cook the food material F with a desired softness while saving energy of the cooking apparatus 1.

In the cooking apparatus 1 of the example embodiments discussed above, the heating of the food material F through the heating portion 20 is terminated in response to the internal temperature of the food material F reaching the target reach temperature in the third temperature range heating operation. On the other hand, in the cooking apparatus 1 according to another example, the controller 90 terminates the heating of the food material F through the heating portion 20 based on the surface state of the food material F. The surface state of the food material F is a surface color of the baked food material F or a shrinkage degree of the surface of the food material F. The controller 90 recognizes the surface state of the food material F based on the imaged image of the food material F received from the imager 50. In the example, the imager 50 is an example of a surface state detector.

In other words, the controller 90 determines the surface state of the food material F based on the image of the food material F, and controls the heating portion 20 to terminate the heating operation based on the surface state of the food material F.

In the cooking apparatus 1 according to this example, the heating of the food material F through the heating part 20 is terminated based on the surface state of the food material F. The surface state of the food material F changes according to a progress degree of the heating-cooking of the food material F. Therefore, when the surface state of the food material F is a pre-set state through heating, the heating of the food material F through the heating portion 20 may be terminated and thus it is possible to appropriately perform the heating-cooking of the food material F.

The cooking apparatus 1 according to examples disclosed herein recognizes the type and size of the food material F put into the cooking chamber 12, and sets the heating-cooking conditions of the food material F based on the type and size of the food material F. On the other hand, in the cooking apparatus 1 according to another example, when a user inputs heating-cooking setting information through the control panel 74, the heating-cooking conditions of the food material F is set according to the setting information.

That is, the controller 90 may determine the heating-cooking conditions based on the heating-cooking setting information input by the user through the control panel 74.

The manipulator 72 of the control panel 74 is configured to receive heating-cooking setting information related to the target reach temperature of the internal temperature of the food material F. For example, the heating-cooking setting information includes information on the type of food material F and information on the degree of cooking of the food material F. The information on the degree of cooking of the food material F is related to the softness when the food material F is heated and cooked. In this example, the heating-cooking conditions are stored in the storage 80 by the number of combinations between the type of the food material F and the degree of cooking of the food material F. In addition, an amount (i.e., size of the food material F) may be input via the manipulator 72. Accordingly, the controller 90 sets the heating-cooking conditions based on the heating-cooking setting information in the manipulator 72, and the controller 90 controls the heating portion 20 to allow the internal temperature of the food material F to reach the target reach temperature at the end time of the heating-cooking of the food material F.

Figure 14:
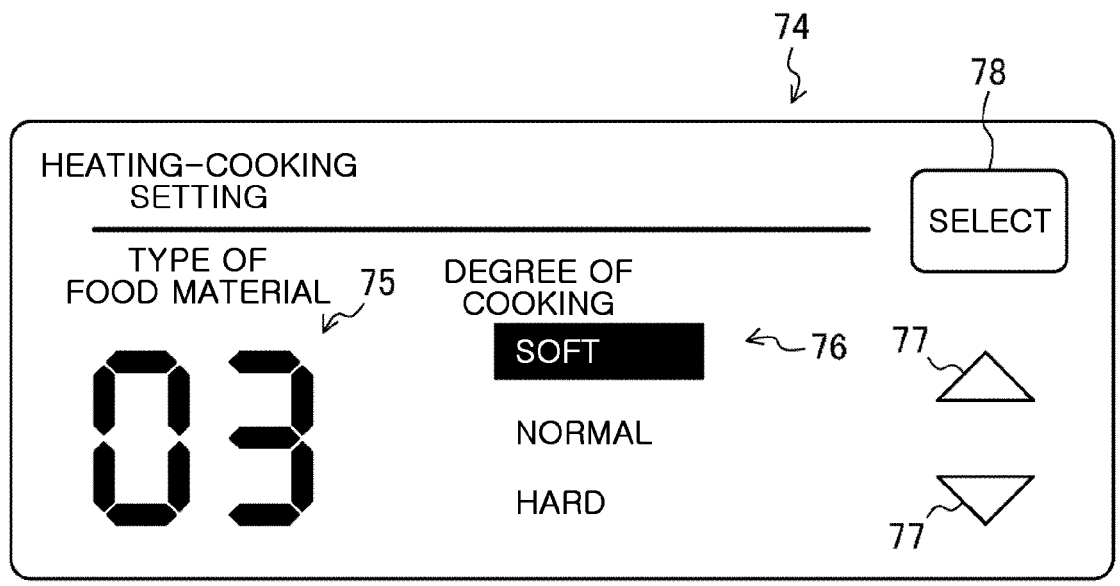
FIG. 14 is a view illustrating a control panel of the cooking apparatus according to an embodiment of the disclosure.
Figure 15:
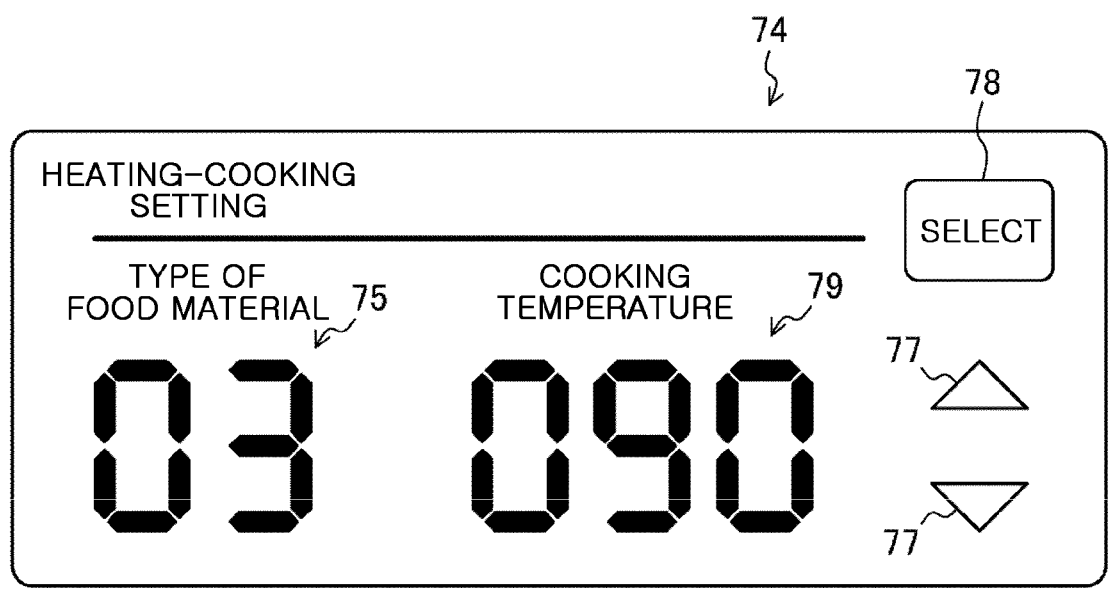
FIG. 15 is a view illustrating the control panel of the cooking apparatus according to an embodiment of the disclosure.

FIGS. 14 and 15 are views illustrating the control panel 74 of the cooking apparatus 1 according to an embodiment of the disclosure.

For example, as illustrated in FIG. 14, a type item 75 for setting the type of the food material F, and a cooking item 76 for setting the degree of cooking of the food material F are displayed on the control panel 74. A number indicating the pre-classified type of the food material F is selectively displayed as the type item 75. Three kinds of "soft", "normal", and "hard" corresponding to the softness index of the food material F are displayed as the cooking item 76. Further, on the control panel 74, a direction key 77 and a decision key 78 for setting the number of the type item 75 and the index of the cooking item 76 are provided as an example configuration of the manipulator 72.

For example, as illustrated in FIG. 15, the type item 75 for setting the type of the food material F, and a temperature item 79 for setting a cooking temperature of the food material F are displayed on the control panel 74. As the temperature item 79, a target value of the internal temperature in the performance of the heating-cooking of the food material F is displayed. For example, the manipulator 72 is configured to adjust a temperature of the temperature item 79 in units of 5° C.

The information on the type of food material F received through the control panel 74 may be information classified into more detailed types with respect to leafy vegetables Le, fruit vegetables and root vegetables Ro. In addition, the information on the type of food material F received through the control panel 74 may be information related to the type of the food material F roughly classified such as vegetables, meat, or fish.

In the cooking apparatus 1 according to an example, the heating-cooking setting information may be input by the user through the manipulator 72. In response to the heating-cooking setting information being received from the manipulator 72, the heating portion 20 is controlled based on the heating-cooking setting information and thus the internal temperature of the food material F reaches the target reach temperature at the time of the termination of the heating-cooking of the food material F. When the food material F is vegetables, the food material F is softer as the internal temperature of the food material F at the time of the termination of the heating-cooking is increased. Accordingly, the user can cook the food material F with a preferred softness by inputting the heating-cooking setting information.

A cooking apparatus 1 configured to automatically perform heating-cooking of a plurality of food materials F will be described, according to an example.

The cooking apparatus 1 according to the example embodiment is different from the cooking apparatus 1 described in other example embodiments in the configuration of the heating portion 20 and the control related to the heating-cooking. In the embodiment, the cooking apparatus 1 is configured in the same manner as in the earlier described embodiments, except that the configuration of the heating portion 20 and the control of the heating-cooking are different. Therefore, only the heating portion 20 having a different configuration and the control related to the heating-cooking will be described, and the same configuration will follow the description of the earlier-described embodiments, and a detailed description thereof will be omitted for the sake of brevity.

Figure 16:
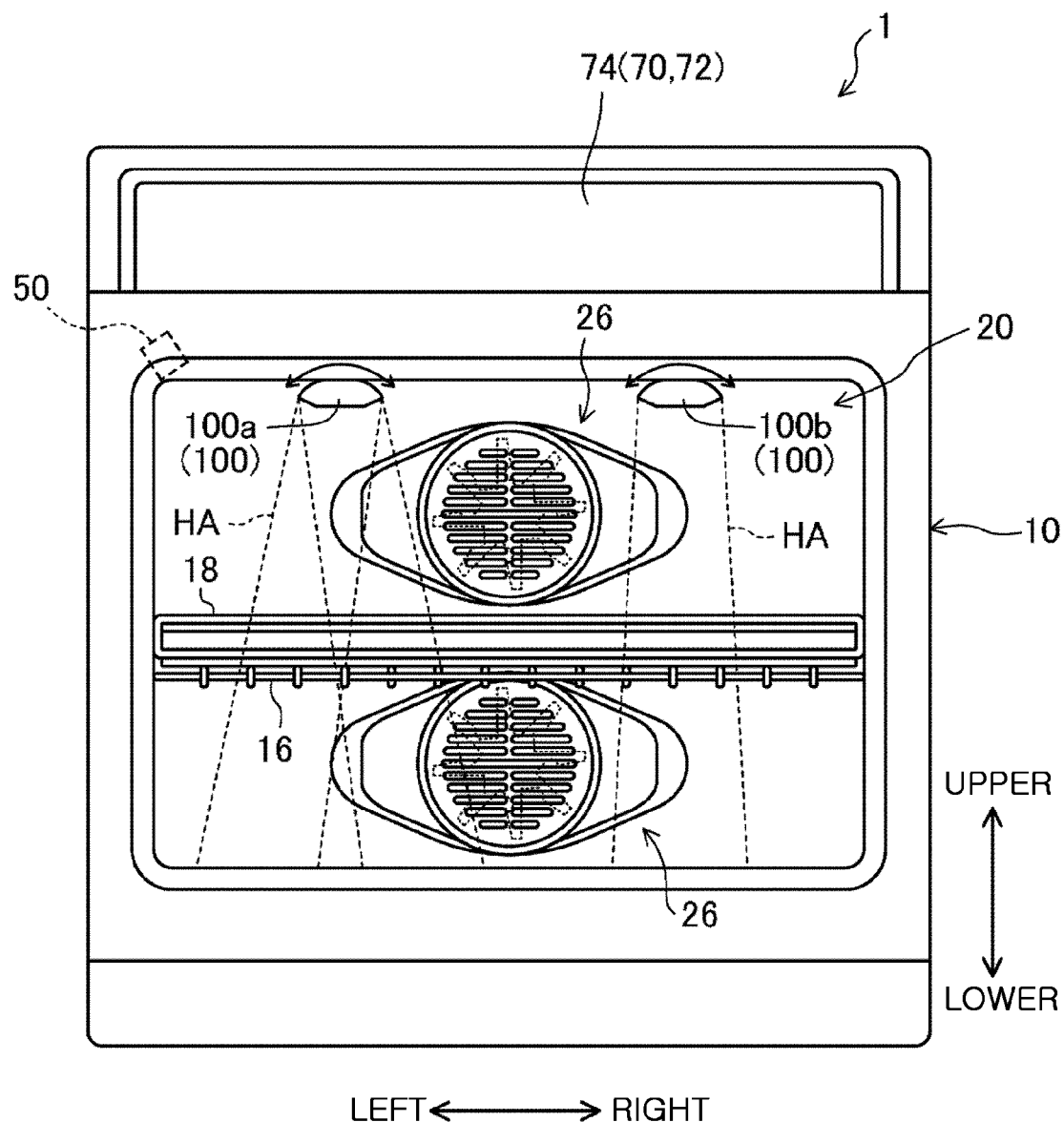
FIG. 16 is a front view of an inside of a cooking chamber of a cooking apparatus according to an embodiment of the disclosure.
Figure 17:
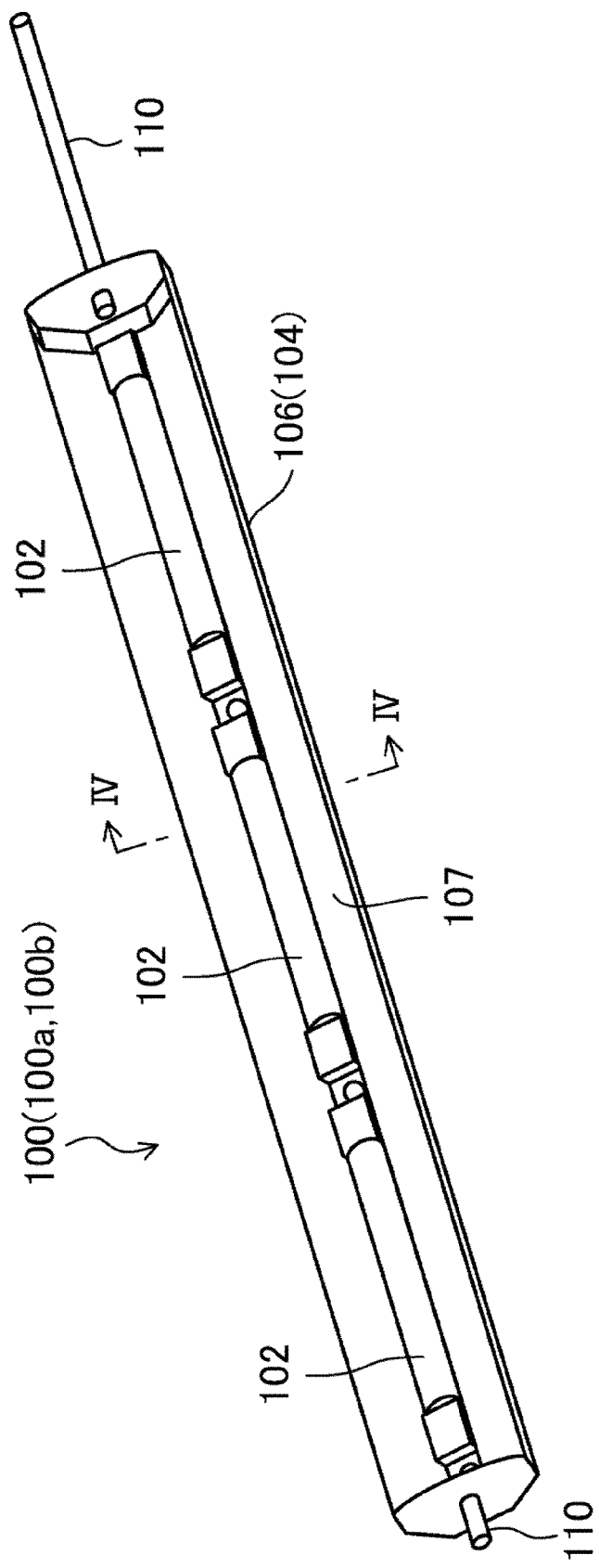
FIG. 17 is a perspective view of an upper heater according to an embodiment of the disclosure.
Figure 18:
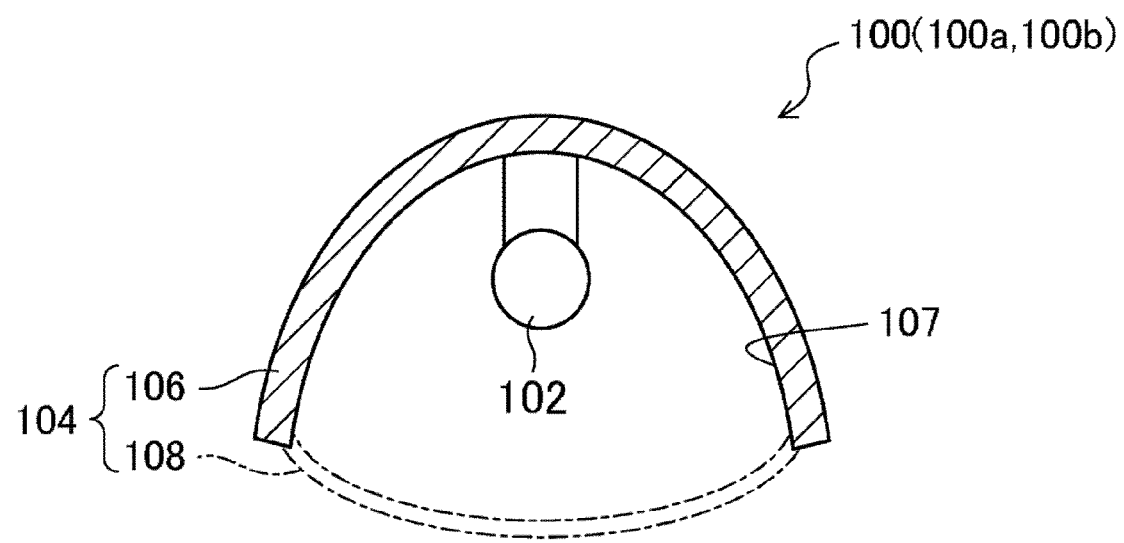
FIG. 18 is a cross-sectional view of the upper heater according to an embodiment of the disclosure.
Figure 19:
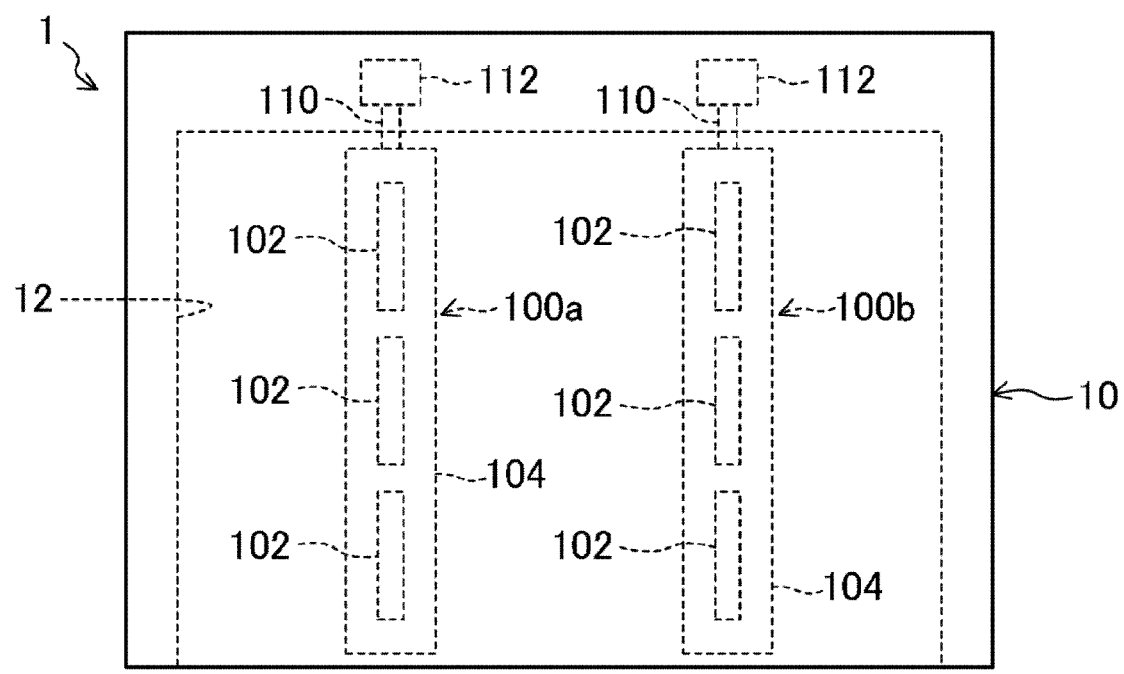
FIG. 19 is a view schematically illustrating an example of arrangement of the upper heater in the cooking chamber according to an embodiment of the disclosure.
Figure 20:
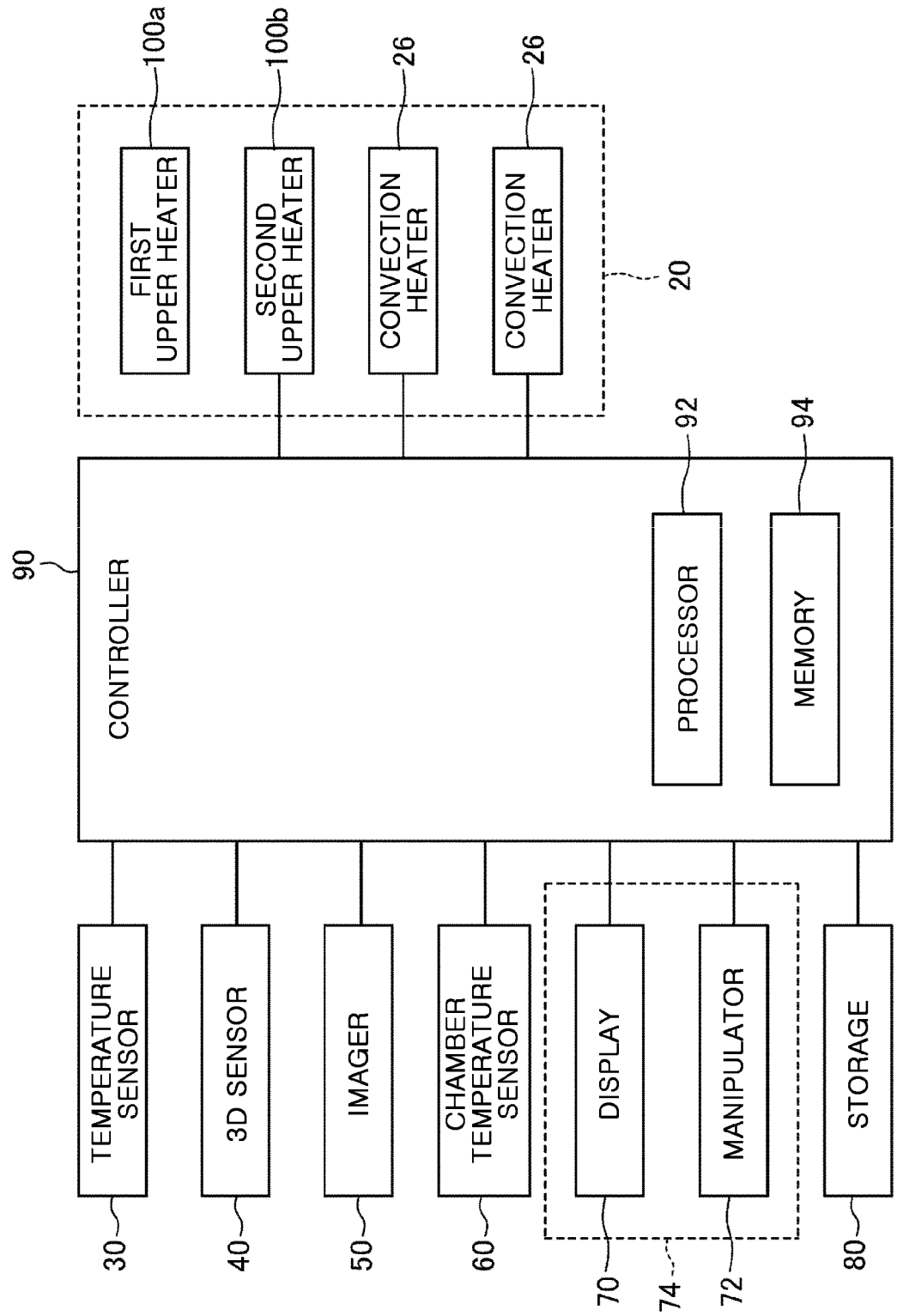
FIG. 20 is a control block diagram of the cooking apparatus according to an embodiment of the disclosure.

FIG. 16 is a front view of an inside of a cooking chamber 12 of a cooking apparatus 1 according to an embodiment of the disclosure, FIG. 17 is a perspective view of an upper heater 100 according to an embodiment of the disclosure, FIG. 18 is a cross-sectional view of the upper heater 100 according to an embodiment of the disclosure, FIG. 19 is a view schematically illustrating an example of arrangement of the upper heater 100 in the cooking chamber 12 according to an embodiment of the disclosure, and FIG. 20 is a control block diagram of the cooking apparatus 1 according to an embodiment of the disclosure.

Referring to FIGS. 16 and 20, in the cooking apparatus 1, the heating portion 20 includes a plurality of heaters, and a plurality of motors configured to transmit a rotational force corresponding to each of the plurality of heaters.

In this case, when a plurality of food materials F is placed in the cooking chamber 12, the controller 90 may determine an area in which each of the plurality of food materials F is arranged based on the 3D shape and image of each of the plurality of food materials F, and the controller 90 may control the plurality of motors to rotate the plurality of heaters to allow the area, in which each of the plurality of food materials F is arranged, to be included in a heating area.

For example, the heating portion 20 includes a plurality of heaters, including a first upper heater 100a, a second upper heater 100b, and a convection heater 26. The first upper heater 100a, the second upper heater 100b, and the convection heater 26 are configured to control an output independently of each other. For example, two convection heaters 26 are provided in the same arrangement as in the earlier-described embodiments.

The first upper heater 100a and the second upper heater 100b are spaced apart from each other in the left and right directions. The first upper heater 100a is arranged on a left side of an upper surface of the cooking chamber 12. The second upper heater 100b is arranged on a right side of the upper surface of the cooking chamber 12. The first upper heater 100a and the second upper heater 100b are provided to extend in the front and rear direction, respectively.

Both the first upper heater 100a and the second upper heater 100b partially heat the inside of the cooking chamber 12. The first upper heater 100a and the second upper heater 100b are examples of a partial heater. The first upper heater 100a and the second upper heater 100b are configured by the upper heater 100 including the same configuration. For example, the upper heater 100 may be an infrared heater. The upper heater 100 is configured to change the heating area HA, that is a region heated within the cooking chamber 12.

As illustrated in FIGS. 17 and 18, for example, the upper heater 100 includes a heater body 102 and a cover 104.

The heater body 102 is a heat source configured to emit infrared rays. The heater body 102 is arranged within the cover 104. The cover 104 includes an upper cover member 106 provided to cover the heater body 102 from an upper side, and a lower cover member 108 provided to cover the heater body 102 from a lower side. Although not shown, a plurality of through holes or a plurality of slits is formed in the lower cover member 108 to illuminate the heater body 102.

A rotating shaft 110 provided to support the upper heater 100 is provided at opposite ends of the cover 104 in a longitudinal direction. Each of the rotating shafts 110 is rotatably supported by wall portions on both front and rear sides of the housing 10. As illustrated in FIG. 19, a rotating mechanism 112 configured to rotate the rotating shaft 110 is mounted on the rotating shaft 110 provided at a rear side of the cover 104. For example, the rotating mechanism 112 includes a motor and a gear.

In the embodiment, the heater body 102 is provided in three pieces (distinct parts). The three heater bodies 102 are respectively arranged along the longitudinal direction of the upper heater 100 so as to be coaxial with an axis of the rotating shaft 110. Accordingly, even when the upper heater 100 is rotated around the rotating shaft 110, a position of each heater body 102 does not change.

An inner surface of the upper cover member 106 forms a reflector 107 provided to reflect infrared rays emitted by the heater body 102. A cross-sectional shape of the reflector 107 forms a parabola with the heater body 102 as a focal point. By providing the parabolic reflector 107, the infrared rays emitted from each heater body 102 are radiated downward with a relatively high directivity.

As illustrated in FIG. 16, when the upper heater 100 is rotated about the rotating shaft 110, the reflector 107 is rotated to change an infrared irradiation area, that is, the heating area HA. Accordingly, the food material area FA in which the food material F is arranged in the cooking chamber 12 may be included in the heating area HA. The rotation of the upper heater 100 is controlled by the controller 90. The controller 90 controls the rotation of the first upper heater 100a and the second upper heater 100b, that is, the driving of each rotating mechanism 112, independently of each other.

<Three-Dimensional (3D) Sensor and Imager>

When a plurality of food materials F is arranged in the cooking chamber 12, the 3D sensor 40 measures a 3D shape of the plurality of food materials F so as to obtain 3D information indicating a 3D shape of each food material F. When a plurality of food materials F is arranged in the cooking chamber 12, the imager 50 obtains an imaged image of the plurality of food materials F. Accordingly, the 3D sensor 40 and the imager 50 detect information of each of the plurality of food materials F.

<Controller>

The controller 90 recognizes the type and size of the food material F as information of each of the plurality of food materials F, based on 3D information received from the 3D sensor 40, and an image of the food material F received from the imager 50 when the plurality of food materials is arranged in the cooking chamber 12. Further, the controller 90 recognizes a food material area FA in which each food material F is arranged in the cooking chamber 12 based on the 3D information and the imaged image.

The controller 90 controls the first upper heater 100a and the second upper heater 100b to heat the food material F for each food material area FA. The controller 90 drives the rotating mechanism 112 corresponding to the first upper heater 100a and the second upper heater 100b and thus the first upper heater 100a and the second upper heater 100b are rotated to allow different food material areas FA or the same food material area FA to be included in the heating area HA. The controller 90 sets heating-cooking conditions for each food material F based on the type and size of each food material F.

The controller 90 may adjust a heating time in a state, in which an internal temperature of one of the plurality of food materials F is greater than the second set temperature (e.g., 60° C.), or less than the first set temperature (e.g., 50° C.), to correspond to a heating time of the other of the plurality of food materials so as to simultaneously complete the heating-cooking of each of the plurality of food materials F.

For example, when different types of first and second food materials are included in the plurality of food materials F arranged in the cooking chamber 12, the controller 90 may adjust a heating time in a state, in which an internal temperature of one of the first food material and the second food material is greater than the second set temperature (e.g., 60° C.), or less than the first set temperature (e.g., 50° C.), to correspond to a heating time of the other of the first food material and the second food material so as to simultaneously complete the heating-cooking of the first food material and the second food material.

A control flow related to the heating-cooking of the cooking apparatus 1 according to the example embodiment is basically the same as the control flow in the cooking apparatus 1 according to the example embodiment shown in FIGS. 7 and 8.

That is, in the cooking apparatus 1, when a plurality of food materials F is put into the cooking chamber 12 and the manipulation for instructing the start of heating-cooking is executed on the control panel 74 (yes in ST1), the controller 90 may receive information from the temperature sensor 30, the 3D sensor 40, the imager 50, and the chamber temperature sensor 60 (ST2), and the controller 90 recognizes the type and size of the plurality of food materials F (ST3).

In response to recognizing the type and size of the plurality of food materials F, the controller 90 sets heating-cooking conditions of each of the food materials based on the type and size of each of the food material F (ST4), and the controller 90 performs heating-cooking of each of the food materials F according to the setting heating-cooking conditions. During the performance of the heating-cooking on the food materials F, the controller 90 estimates and monitors an internal temperature of each of the food materials F based on a surface temperature of the food materials F received from the temperature sensor 30.

When the heating-cooking of the plurality of food materials F is started, the controller 90 rotates the first upper heater 100a and the second upper heater 100b as necessary to allow the different food material areas FA to be included in at least one of heating area HA. When vegetables are included in the plurality of food materials F, the controller 90 performs the first temperature range heating operation and the second temperature range heating operation for the vegetables, and additionally performs the third temperature range heating operation as necessary.

When two or more types of vegetables are put into the cooking chamber 12, the controller 90 independently performs the first temperature range heating operation and the second temperature range heating operation for these various vegetables, and additionally performs the third temperature range heating operation as necessary. When the first temperature range heating operation is started (ST5-1), the controller 90 controls the operation state and the output of the first upper heater 100a, the second upper heater 100b, and the convection heater 26 to adjust a performance time of the first temperature range heating operation of the target food material F, that is a period of time from when the first temperature range heating operation is started until an internal temperature of the food material F reaches 50° C., so as to simultaneously complete the heating-cooking of the plurality of food materials.

In response to determining that the internal temperature of the target food material is greater than or equal to 50° C. (yes in ST5-2) during the first temperature range heating operation, the controller 90 terminates the first temperature range heating operation and starts the second temperature range heating operation (ST5-3). During the second temperature range heating operation, the controller 90 heats the target food material by driving the upper heater 100 and the convection heater 26 corresponding to the target food material F among the first upper heater 100a and the second upper heater 100b with a predetermined output, so as to implement the target rate of temperature rise according to the heating-cooking conditions. Accordingly, the internal temperature of the target food material in the cooking chamber 12 is increased at the rate of 2.0° C./min or more according to the type of the food material F.

During the second temperature range heating operation, in response to determining that the internal temperature of the food material is greater than 60° C. (ST5-4), the controller 90 terminates the second temperature range heating operation (ST5-5). In response to the target reach temperature of the target food material F being 60° C. (no in ST5-6), the controller 90 completes the heating-cooking. In response to the target reach temperature of the target food material F being greater than 60° C. (yes in ST5-6), the controller 90 starts the third temperature range heating operation (ST5-7).

When the third temperature range heating operation is started, the controller 90 controls the operation state and the output of the first upper heater 100a, the second upper heater 100b, and the convection heater 26 to adjust a performance time of the third temperature range heating operation of the target food material F, that is a period of time from when the third temperature range heating operation is started until the internal temperature of the target food material F reaches the target reach temperature, so as to simultaneously complete the heating-cooking of the plurality of food materials. In response to determining that the internal temperature of the target food material F reaches the target reach temperature (yes in ST5-8) during the third temperature range heating operation, the controller 90 terminates the third temperature range heating operation (ST5-9).

—Example of Heating-Cooking Using Cooking Apparatus—

Hereinafter a case in which meat Me and leafy vegetables Le are heated and cooked at the same time will be described as an example of cooking using the cooking apparatus 1. Meat Me is an example of the first food material Fa. The leafy vegetables Le is an example of the second food material Fb.

Figure 21:
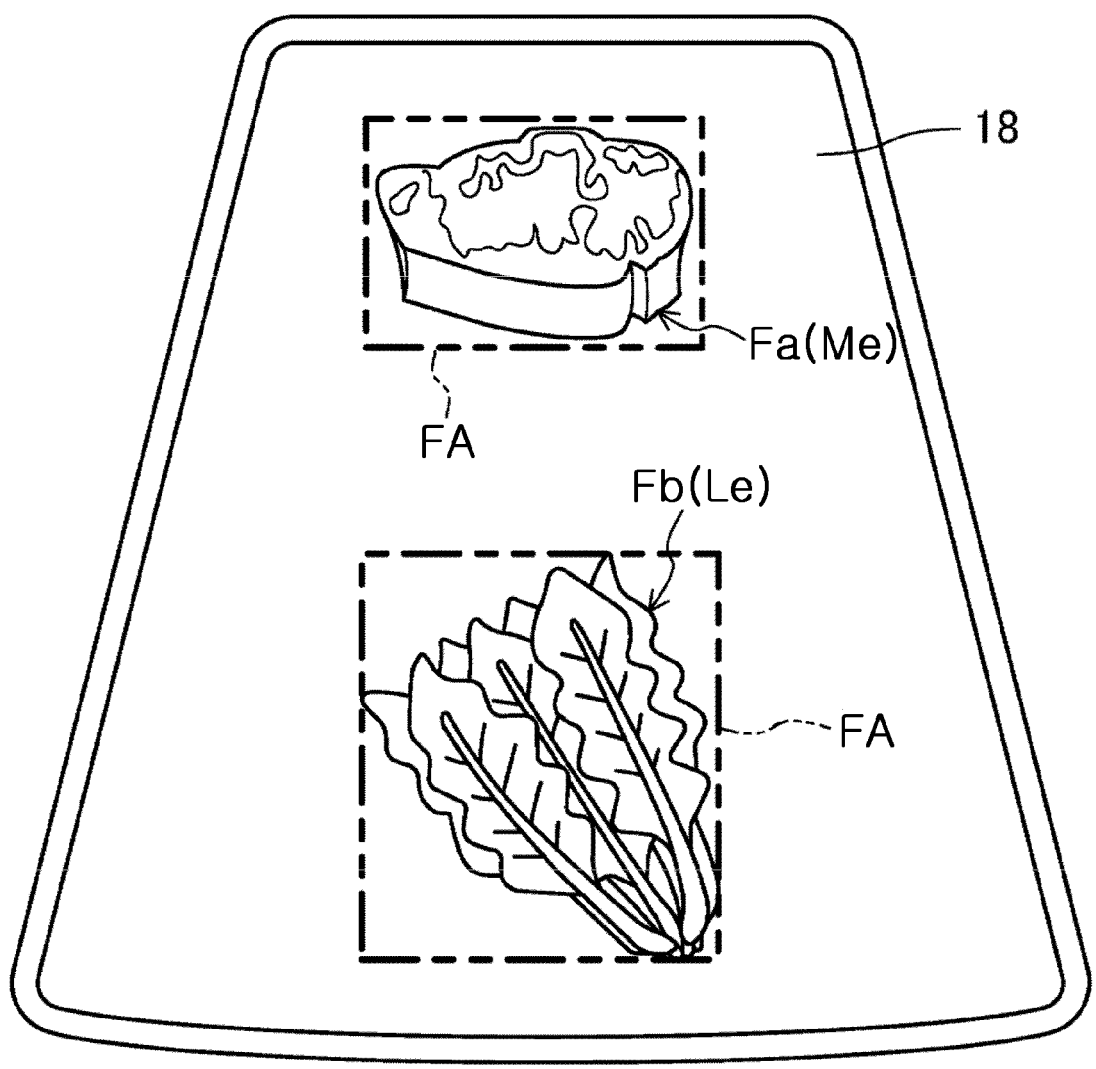
FIG. 21 is a view illustrating an image of a plurality of food materials obtained by an imager of the cooking apparatus according to an embodiment of the disclosure.
Figure 22:
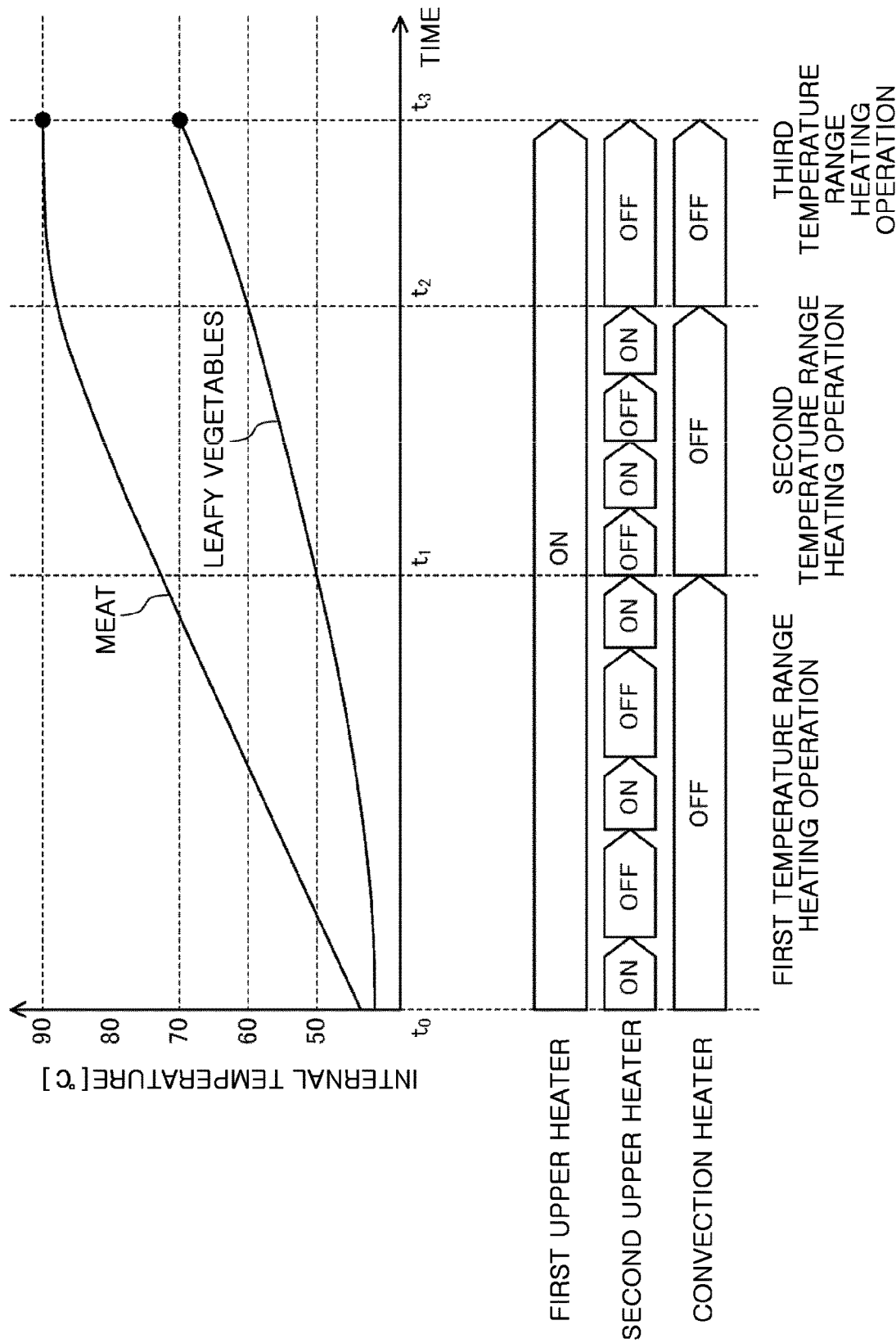
FIG. 22 is a timing chart illustrating an operation of the cooking apparatus according to an embodiment of the disclosure.

FIG. 21 is a view illustrating an image of a plurality of food materials obtained by the imager 50 of the cooking apparatus 1 according to an embodiment of the disclosure, and FIG. 22 is a timing chart illustrating an operation of the cooking apparatus 1 according to an embodiment of the disclosure.

In response to a manipulation for instructing the start of the heating-cooking being executed on the control panel 74 by a user after meat Me and leafy vegetables Le are put to the cooking chamber 12, the controller 90 recognizes the type (meat Me and leafy vegetables Le or a specific type of meat Me and leafy vegetables Le) and the size of each of the food materials F arranged in the cooking chamber 12 based on the 3D information of the food materials received from the 3D sensor 40 and the imaged image of the food materials received from the imager 50, and at the same time, the controller 90 recognizes a food material area FA in which each of the food materials F is arranged and obtains a surface temperature of each of the food materials F.

As illustrated in FIG. 22, when meat Me and leafy vegetables Le are simultaneously heated and cooked using the cooking apparatus 1, the first upper heater 100a is appropriately rotated to allow a food material area FA of the meat Me to be included in a heating area HA, and the second upper heater 100b is appropriately rotated to allow a food material area FA of the leafy vegetables Le to be included in the heating area HA. For example, the meat Me includes beef or pork, and the leafy vegetables Le includes spinach, or Japanese mustard spinach. In this case, as the heating-cooking conditions of the leafy vegetables Le, the target rate of temperature rise may be set to 2.3° C./min, and the target reach temperature may be set to 70° C. for the leafy vegetables Le and 90° C. for the meat Me.

In the cooking apparatus 1, a preset heating operation is performed on the meat Me. For example, in the heating operation for the meat Me, the first upper heater 100a is driven in the continuous operation state from the start of the heating-cooking to the completion of the heating-cooking (from time t0 to time t3) based on an estimated internal temperature of the meat Me. In this heating operation, the operation state of the first upper heater 100a is not limited thereto, and the first upper heater 100a may be driven in the continuous operation state or the intermittent operation state by a combination with the heating by the convection heater 26, so as to cook the meat Me with gravy.

In addition, in the cooking apparatus 1, the first temperature range heating operation, the second temperature range heating operation, and the third temperature range heating operation are performed to complete the heating-cooking of the leafy vegetables Le at the same time as the meat Me. For this, when the cooking apparatus 1 starts the heating-cooking, the controller 90 sequentially calculates and obtains a period of time until the heating-cooking of the meat Me is completed.

In the first temperature range heating operation, the second upper heater 100b is driven to heat the leafy vegetables Le. For example, in the first temperature range heating operation, the second upper heater 100b is driven in the intermittent operation state, and the convection heater 26 is not driven. The operation state of the heating portion 20 in the first temperature range heating operation is not limited thereto, and at least one of the second upper heater 100b and the convection heater 26 may be driven in the continuous operation state or the intermittent operation state to increase the internal temperature of the food material F to 50° C. In this case, the output of the second upper heater 100b is adjusted to match a time, in which the heating-cooking of the leafy vegetables Le is completed, with a time in which the heating-cooking of the meat Me is completed.

In the second temperature range heating operation, the second upper heater 100b is driven to heat the leafy vegetables Le. For example, in the second temperature range heating operation, the second upper heater 100b is driven in the intermittent operation state, and the convection heater 26 is not driven. In the second temperature range heating operation, the operation state of the heating portion 20 is not limited thereto, at least one of the second upper heater 100b and the convection heater 26 may be driven in the continuous operation state or the intermittent operation state to increase the internal temperature of the food material F to 60° C. and to allow the rate of the internal temperature rise of the leafy vegetables Le to be the target rate of temperature rise.

In the third temperature range heating operation, the leafy vegetables Le is heated with residual heat in the cooking chamber (for example, heat from the first upper heater 100a). For example, in the third temperature range heating operation, neither the second upper heater 100b nor the convection heater 26 is driven. In the third temperature range heating operation, the operation state of the heating portion 20 is not limited thereto, and at least one of the second upper heater 100b and the convection heater 26 may be driven in the continuous operation state or the intermittent operation state to allow the internal temperature of the food material F to reach the target reach temperature. In this case, the output of the first upper heater 100a is adjusted to match the time, in which the heating-cooking of the leafy vegetables Le is completed, with the time in which the heating-cooking of the meat Me is completed.

By performing the heating-cooking in the cooking apparatus 1 as described above, the heating-cooking of the meat Me and the leafy vegetables Le may be completed at the same time, and the meat Me and the leafy vegetables Le may be cooked with a moderately soft and preferred texture and taste.

In the above example, the case of performing the heating-cooking of the meat Me and leafy vegetables Le, at the same time is described. However, in the cooking apparatus 1, it is possible to simultaneously cook meat Me and one of root vegetables Ro and fruits and vegetables, or to simultaneously cook two or more different types of vegetables selected from root vegetables Ro, leafy vegetables Le, and fruits and vegetables.

In the cooking apparatus 1, when different types of first food material Fa and second food material Fb are placed in the cooking chamber 12, information of each of the first food material Fa and the second food material Fb is detected, and the heating-cooking of the first food material Fa and the heating-cooking of the second food material Fb are completed at the same time by adjusting the heating time in the state, in which the internal temperature of one of the first food material Fa and the second food material Fb is greater than 60° C., or less than 50° C., to correspond to a heating time of the other of the first food material Fa and the second food material Fb. Accordingly, while simultaneously cooking the first food material Fa and the second food material Fb, the two types of food materials Fa and Fb may be cooked with a preferred texture and taste.

Figure 23:
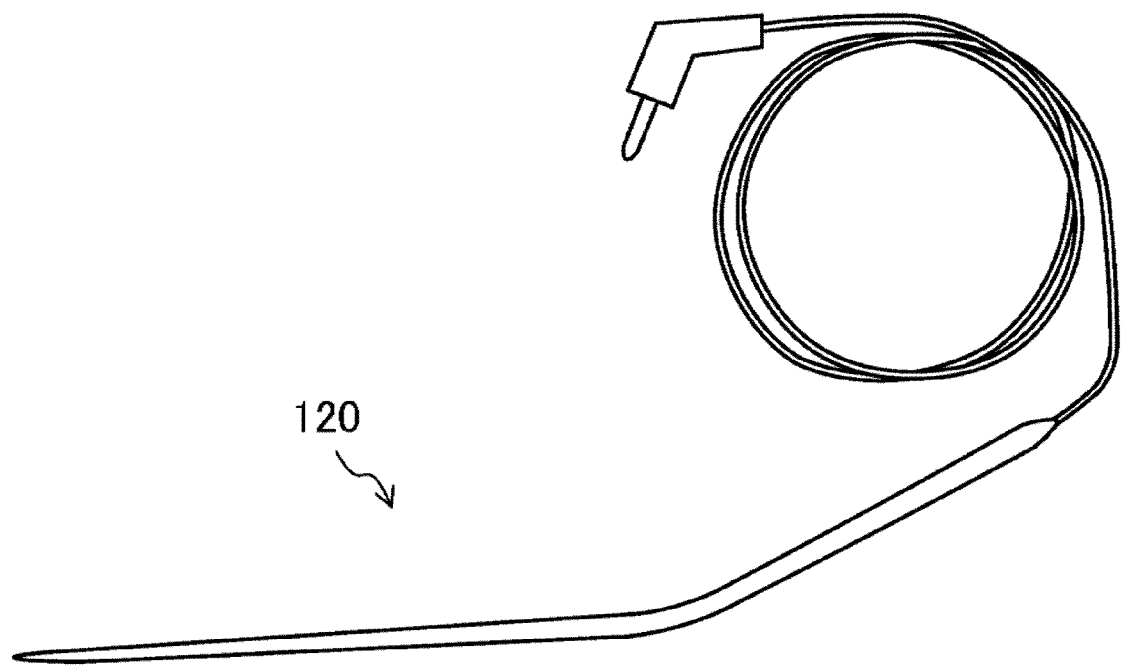
FIG. 23 is a diagram illustrating a configuration of a temperature sensor of a cooking apparatus according to an embodiment of the disclosure.

FIG. 23 is a diagram illustrating a configuration of a temperature sensor 30 of a cooking apparatus 1 according to an embodiment of the disclosure.

In one or more example embodiments disclosed herein, the case in which the temperature sensor 30 measures the surface temperature of the food material F in a non-contact manner, and the controller 90 estimates the internal temperature of the food material F from the surface temperature of the food material F is described as an example, but the disclosure is not limited thereto. The temperature sensor 30 may be configured to directly measure the internal temperature of the food material F. For example, as illustrated in FIG. 23, the temperature sensor 30 may include a temperature probe 120 provided to be inserted into the food material F to detect the internal temperature of the food material.

In one or more example embodiments disclosed herein, the case in which the heating portion 20 includes the plurality of heaters, for example, the upper heater 22, the lower heater 24, and the convection heater 26, is described, but the disclosure is not limited thereto. Alternatively, the heating portion 20 may include only the upper heater 22 and the convection heater 26 or may include only the upper heater 22 and the lower heater 24. In addition, the heating portion 20 may be provided as a single heater.

In one or more example embodiments disclosed herein, the case in which the heating portion 20 includes two upper heaters 100 and the convection heater 26, is described, but the disclosure is not limited thereto. Alternatively, the heating portion 20 may include three or more upper heaters 100. In addition, the heating portion 20 may include only the plurality of upper heaters 100. The arrangement of the upper heater 100 is not limited to the above arrangement and thus the arrangement thereof may vary. The case in which the upper heater 100 is provided as an infrared heater is described, but the disclosure is not limited thereto. Alternatively, the upper heater 100 may be provided as a heating wire.

In one or more example embodiments disclosed herein, the case in which the controller 90 recognizes the type and size of the food material F arranged in the cooking chamber 12, based on the 3D information received from the 3D sensor 40 and the imaged image received from the imager 50, is described, but the disclosure is not limited thereto. The cooking apparatus 1 may be configured to receive a manipulation (e.g. an input from a user), which is to designate the size of the target food material F, through the control panel 74.

In one or more example embodiments disclosed herein, the case in which the image and the heating-cooking conditions of the food material are stored in the storage 80 installed in the cooking apparatus 1 is described, but the disclosure is not limited thereto. Alternatively, some or all of the image and the heating-cooking conditions of the food material may be stored in a cloud server on the Internet, and the controller 90 may access the Internet to properly obtain the image and the heating-cooking conditions of the food material from the cloud server.

In one or more example embodiments disclosed herein, the case in which the cooking apparatus 1 according to the disclosed technology is an oven is described as an example, but the oven is only an example of the cooking apparatus 1. Therefore, the disclosed technology may be applied to other cooking apparatuses such as a microwave oven or a grill accompanying a burner.

As is apparent from the above description, the cooking apparatus and the control method thereof may allow a food material to be automatically cooked with a proper texture and taste without requiring a complicated operation from a user.

As described above, embodiments are described as examples of the technology according to the disclosure. However, the disclosed technology is not limited thereto, and may be applied to other embodiments in which changes, substitutions, additions, omissions, and the like are appropriately performed. In addition, it is also possible to make a new embodiment by combining components described with respect to different embodiments. In addition, some of the components described in the accompanying drawings and detailed description may also include components that are not essential for solving the problem. For this reason, these non-essential components should not be immediately found to be essential components based on the fact that they are included in the accompanying drawings or detailed description.

Meanwhile, one or more aspects of the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium, for example, a non-transitory computer-readable recording medium.

The computer-readable recording medium includes all kinds of recording media in which instructions which can be decoded by a computer are stored. For example, the computer-readable recording medium may include at least one of a Read Only Memory (ROM), a Random Access Memory (RAM), a magnetic tape, a magnetic disk, a flash memory, and an optical data storage device.

Although example embodiments of the disclosure have been shown and described, it would be appreciated by those skilled in the art that changes may be made to these embodiments without departing from the principles and spirit of the disclosure, the scope of which is defined in the claims and their equivalents.

What is claimed is:

1. A cooking apparatus, comprising:
   a cooking chamber;
   a heating portion configured to heat an inside of the cooking chamber, the heating portion including a plurality of heaters and a plurality of motors configured to transmit a rotational force corresponding to each heater among the plurality of heaters;
   a temperature sensor disposed inside the cooking chamber and configured to detect a temperature of a food material, when the food material is placed in the cooking chamber;
   a three-dimensional (3D) sensor configured to detect a 3D shape of the food material;
   an imager configured to obtain an image of the food material by imaging the inside of the cooking chamber; and
   a processor configured to:
      determine conditions including a target rate of an internal temperature rise of the food material and a target reach internal temperature of the food material, based on a type and a size of the food material,
      adjust an output of the heating portion based on the conditions and an internal temperature of the food material determined based on the temperature of the food material detected by the temperature sensor,
      when a plurality of food materials are placed in the cooking chamber, determine one or more areas, in which each food material among the plurality of food materials is placed, based on the 3D shape of each food material detected by the 3D sensor and an image of each food material among the plurality of food materials obtained by the imager, and
      control the plurality of motors to rotate the plurality of heaters to allow the one or more areas, in which each food material among the plurality of food materials is placed, to be included in a heating area heated by one or more of the plurality of heaters.

2. The cooking apparatus of claim 1,
   wherein the processor is configured to determine the type and the size of the food material based on the 3D shape of the food material detected by the 3D sensor and the image of the food material obtained by the imager.

3. The cooking apparatus of claim 2, wherein the processor is configured to:
   control the heating portion to perform a first temperature range heating operation until the internal temperature of the food material reaches a first set temperature, and
   control the heating portion to perform a second temperature range heating operation in which a rate of the internal temperature rise of the food material follows the target rate of the internal temperature rise of the food material in a range in which the internal temperature of the food material is greater than or equal to the first set temperature and less than or equal to a second set temperature.

4. The cooking apparatus of claim 3, wherein
   the processor is configured to, in response to the internal temperature of the food material reaching the second set temperature, control the heating portion to perform a third temperature range heating operation until the internal temperature of the food material reaches the target reach internal temperature of the food material.

5. The cooking apparatus of claim 3, further comprising:
   a control panel,
   wherein the processor is configured to:
      control the heating portion to terminate a heating operation in response to the internal temperature of the food material reaching the second set temperature, and
      control the control panel to output a cooking completion notification in response to the internal temperature of the food material reaching the target reach internal temperature of the food material.

6. The cooking apparatus of claim 3, wherein the processor is configured to:
   determine a surface state of the food material based on the image of the food material, and
   control the heating portion to terminate a heating operation based on the surface state of the food material.

7. The cooking apparatus of claim 2, further comprising:
   a control panel configured to receive an input by a user,
   wherein the processor is configured to determine the conditions based on setting information input by the user through the control panel.

8. The cooking apparatus of claim 2, wherein the processor is configured to:
   determine a surface temperature of the food material based on an output of the temperature sensor, and
   determine the internal temperature of the food material based on the surface temperature of the food material.

9. The cooking apparatus of claim 1, wherein
   the plurality of food materials include a first food material and a second food material, and
   the processor is configured to adjust a heating time in a state, in which an internal temperature of the first food material is greater than a second set temperature or less than a first set temperature, to correspond to a heating time of the second food material, so as to simultaneously complete cooking of the first food material and the second food material.

10. A control method of a cooking apparatus including a cooking chamber in which a food material is to be placed, a heating portion configured to heat an inside of the cooking chamber, the heating portion including a plurality of heaters and a plurality of motors which transmit a rotational force corresponding to each heater among the plurality of heaters, a temperature sensor disposed inside the cooking chamber, a three-dimensional (3D) sensor configured to detect a 3D shape of the food material, and an imager configured to obtain an image of the food material by imaging the inside of the cooking chamber, the control method comprising:
   determining conditions including a target rate of an internal temperature rise of the food material and a target reach internal temperature of the food material, based on a type and a size of the food material; and
   adjusting an output of the heating portion based on the conditions and an internal temperature of the food material determined based on a temperature of the food material detected by the temperature sensor,
   wherein the adjusting the output of the heating portion includes:

when a plurality of food materials are placed in the cooking chamber, determining one or more areas, in which each food material among the plurality of food materials is placed, based on the 3D shape of each food material detected by the 3D sensor and an image of each food material among the plurality of food materials obtained by the imager, and controlling the plurality of motors to rotate the plurality of heaters to allow the one or more areas, in which each food material among the plurality of food materials is placed, to be included in a heating area heated by one or more of the plurality of heaters.

11. The control method of claim 10, further comprising:
determining the type and the size of the food material based on a three-dimensional (3D) shape of the food material detected by a 3D sensor of the cooking apparatus and based on an image of the food material obtained by an imager of the cooking apparatus when the food material is placed inside the cooking chamber.

12. The control method of claim 11, wherein adjusting the output of the heating portion includes:
controlling the heating portion to perform a first temperature range heating operation until the internal temperature of the food material reaches a first set temperature, and controlling the heating portion to perform a second temperature range heating operation in which a rate of the internal temperature rise of the food material follows the target rate of the internal temperature rise of the food material in a range in which the internal temperature of the food material is greater than or equal to the first set temperature and less than or equal to a second set temperature.

13. The control method of claim 12, wherein adjusting the output of the heating portion includes, in response to the internal temperature of the food material reaching the second set temperature, controlling the heating portion to perform a third temperature range heating operation until the internal temperature of the food material reaches the target reach internal temperature of the food material.

14. The control method of claim 12, wherein adjusting the output of the heating portion includes:
controlling the heating portion to terminate a heating operation in response to the internal temperature of the food material reaching the second set temperature, and controlling a control panel of the cooking apparatus to output a cooking completion notification in response to the internal temperature of the food material reaching the target reach internal temperature of the food material.

* * * * *